(12) United States Patent
Ivanov et al.

(10) Patent No.: US 11,106,260 B2
(45) Date of Patent: Aug. 31, 2021

(54) SMART CHARGING PLATFORM

(71) Applicant: Microsoft Technology Licensing, LLC, Redmond, WA (US)

(72) Inventors: George I. Ivanov, Renton, WA (US); Sean P. Byrnes, Seattle, WA (US); Nagaraju Valluri, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 15/895,985

(22) Filed: Feb. 13, 2018

(65) Prior Publication Data
US 2019/0250689 A1    Aug. 15, 2019

(51) Int. Cl.
*G06F 1/00*    (2006.01)
*G06F 1/3203*    (2019.01)
(Continued)

(52) U.S. Cl.
CPC ........ *G06F 1/3203* (2013.01); *G06F 3/04847* (2013.01); *H02J 1/14* (2013.01); *H02J 7/007* (2013.01); *H02J 7/025* (2013.01); *H02J 7/0013* (2013.01); *H02J 7/0027* (2013.01); *H02J 7/34* (2013.01)

(58) Field of Classification Search
CPC .................................................... G06F 1/3203
See application file for complete search history.

(56) References Cited

U.S. PATENT DOCUMENTS

| 5,565,759 A | 10/1996 | Dunstan |
| 5,572,110 A | 11/1996 | Dunstan |

(Continued)

FOREIGN PATENT DOCUMENTS

| WO | 2011046645 A1 | 4/2011 |
| WO | 2012092177 A2 | 7/2012 |

OTHER PUBLICATIONS

Abousleiman, et al., "Smart Charging: System Design and Implementation for Interaction between Plug-in Electric Vehicles and the Power Grid", In Journal of IEEE Transactions on Transportation Electrification, vol. 1, Issue 1, Jun. 2015, pp. 18-25.

(Continued)

*Primary Examiner* — Mohammed H Rehman
(74) *Attorney, Agent, or Firm* — Ray Quinney & Nebeker P.C.; Paul N. Taylor

(57) ABSTRACT

Methods, systems, and apparatuses are provided for balancing power delivery in a computing component between one or more power providers and power consumers. A power provider and multiple power consumers are identified. Once identified, a power delivery capability of the power provider and the power consumption demands of the power consumers may be determined. Power allocation factors are obtained that provide information regarding allocation of power between the power provider and the power consumers. In some instances, an interactive user interface may be provided that enables a user to configure a power allocation factor, such as a charging parameter for a power consumer. Using this information, a dynamic power allocation may be performed to allocate power from the power provider to the multiple power consumers.

24 Claims, 7 Drawing Sheets

(51) Int. Cl.
  *G06F 3/0484* (2013.01)
  *H02J 7/00* (2006.01)
  *H02J 7/02* (2016.01)
  *H02J 1/14* (2006.01)
  *H02J 7/34* (2006.01)

(56) References Cited

U.S. PATENT DOCUMENTS

| | | | |
|---|---|---|---|
| 6,198,253 | B1 | 3/2001 | Kurle et al. |
| 6,754,837 | B1* | 6/2004 | Helms ................ G06F 1/3203 |
| | | | 713/322 |
| 8,138,723 | B2 | 3/2012 | Carkner |
| 8,736,227 | B2 | 5/2014 | Chadbourne et al. |
| 9,692,250 | B2 | 6/2017 | Priev et al. |
| 9,755,449 | B2 | 9/2017 | Nge et al. |
| 2006/0061948 | A1* | 3/2006 | Yin .................... G06F 1/1635 |
| | | | 361/679.29 |
| 2012/0169291 | A1 | 7/2012 | Abe et al. |
| 2012/0286726 | A1* | 11/2012 | Kim .................... H02J 50/40 |
| | | | 320/108 |
| 2013/0264998 | A1 | 10/2013 | Schul et al. |
| 2015/0092329 | A1* | 4/2015 | Balasundaram ...... G06F 1/1692 |
| | | | 361/679.09 |
| 2015/0145468 | A1* | 5/2015 | Ma .................... H02J 7/007 |
| | | | 320/107 |
| 2016/0110148 | A1* | 4/2016 | Egle .................... G06F 3/147 |
| | | | 345/173 |
| 2016/0336745 | A1 | 11/2016 | Pandya et al. |
| 2017/0048370 | A1* | 2/2017 | Kim .................... H04M 1/7253 |
| 2017/0373522 | A1 | 12/2017 | Pelosi et al. |

OTHER PUBLICATIONS

"International Search Report and Written Opinion Issued in PCT Application No. PCT/US2019/015054", dated Jun. 24, 2019, 12 Pages.

* cited by examiner

User Interface 400

| Consumer A | Category 1 | Value | Unit |
|---|---|---|---|
| Priority | | 1 | N/A |
| Duration | | 10 | Minutes |
| Charging Rate | | 3000 | Milliamps |
| Target Percentage | | 100 | N/A |

Edit | Save | Default

SMART CHARGING PLATFORM

BACKGROUND

A computing device may serve as a charging hub for a power consumer. The computing device may receive power from a power source, such as an external power supply and/or contain an internal battery from which power may be drawn. When a power consumer is coupled to the computing device, the power available from either the external power source or the internal battery may be provided to the consumer. Power received by the computing device from the power source and delivered by the computing device to the coupled consumer typically occur at fixed rates.

When a power supply is plugged into a computing device, the computing device draws as much power as the power supply is capable of providing, which can lead to overcharging the internal battery and/or decreasing its lifespan in the long term. Drawing too much charge can result in voltage droops that negatively impact operation of internal components of the computing device (e.g., processors), which may require a minimum operating power, potentially leading to data loss or a non-functioning system.

Power may be provided by the computing device as soon as the consumer is coupled. The power continues to be provided until the computing device and consumer are disconnected or until the computing system is no longer able to provide power, which may drain the computing device's battery.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for balancing the power delivery in a computing component. A power provider and multiple power consumers are identified. A power delivery capability (e.g., the amount of power that may be provided) of the power provider and the power consumption demands of the power consumers are determined. In implementations, an interactive user interface may be provided that enables a user to configure one or more power allocation factors. For instance, the power allocation factors may include a charging parameter (e.g., a charging priority, a performance parameter such as a desired performance mode, etc.) for a power consumer. Based on the power delivery capability, the power consumption demands, and the power allocation factors, the power from the power provider may be dynamically allocated to the multiple power consumers.

Further features and advantages, as well as the structure and operation of various implementations, are described in detail below with reference to the accompanying drawings. It is noted that the implementations are not limited to the specific implementations described herein. Such implementations are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate implementations of the present application and, together with the description, further serve to explain the principles of the implementations and to enable a person skilled in the pertinent art to make and use the implementations.

Figure 1:
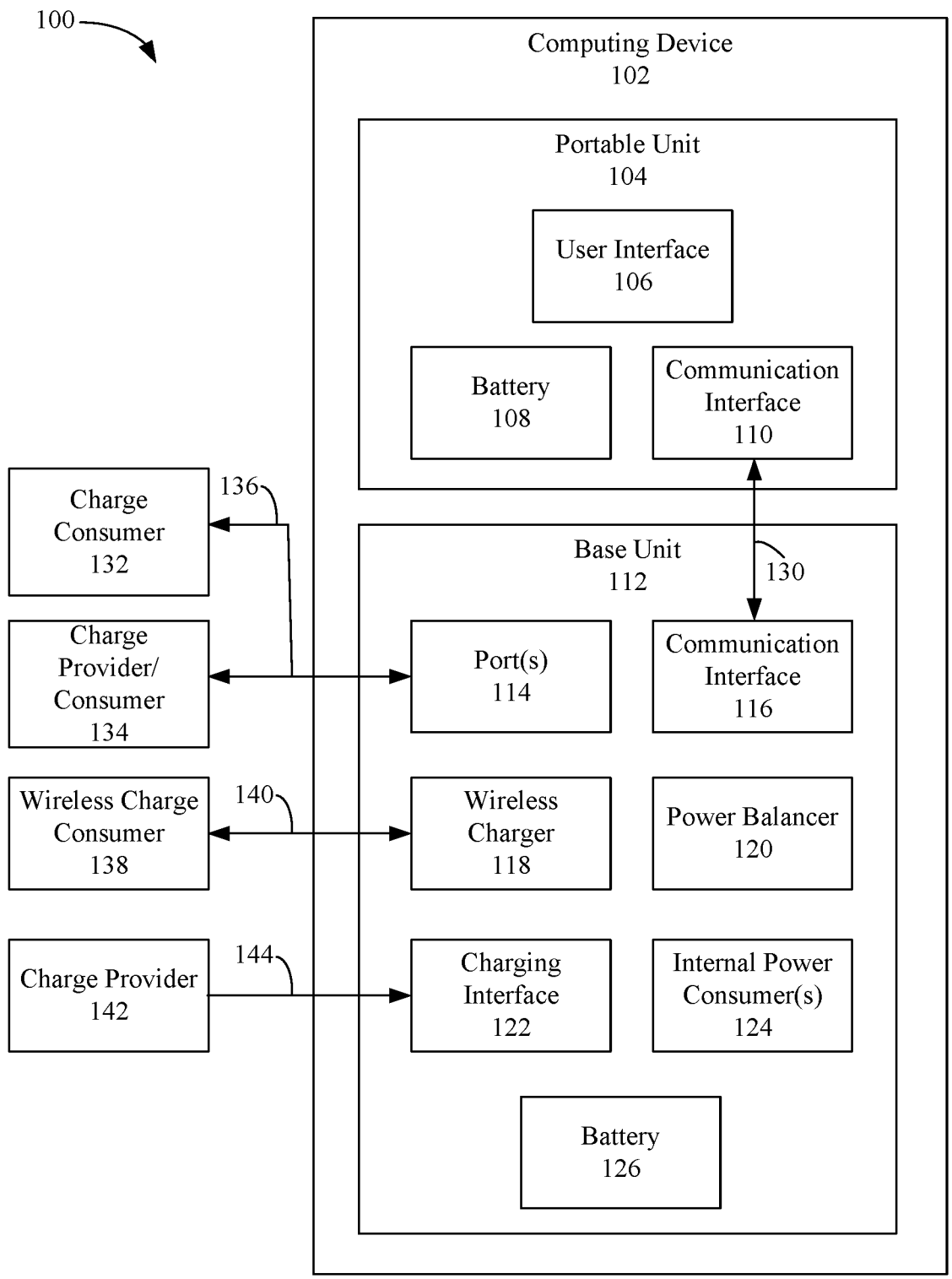
FIG. 1 shows a block diagram of a system for balancing power delivery, according to an example implementation.

The features and advantages of the disclosed implementations will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more implementations that incorporate the features of the present invention. The scope of the present invention is not limited to the disclosed implementations. The disclosed implementations merely exemplify the present invention, and modified versions of the disclosed implementations are also encompassed by the present invention. Implementations of the present invention are defined by the claims appended hereto.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, are understood to mean that the condition or characteristic is defined to within tolerances that are acceptable for operation of the implementation for an application for which it is intended.

Numerous example implementations are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner II. Example Implementations.

A computing device may serve as a charging hub for power consumers. The computing device may receive power from a power source, such as an external power supply and/or contain an internal battery from which power may be drawn. When a power consumer is coupled to the computing device, the power available from either the external power source or the internal battery may be provided to the consumer. However, power drawn by the computing device from the external power source and the delivery of power by the computing device to the coupled consumer are commonly conducted at fixed rates that may not be modified.

Typically, when a power supply is plugged into a computing device, the computing device draws as much power as the power supply is capable of providing, which can lead to overcharging the internal battery and decreasing its lifespan in the long term. In addition, providing too much charge to a system and its accessories can result in voltage droops, which can negatively impact the operation of internal components of the computing device (e.g., processors) that require a minimum operating power, thus leading to data loss or a non-functioning system.

In addition, power may be delivered between the devices at these fixed rates as soon as the devices are coupled, and power continues to be delivered until the devices are disconnected or until the computing system is no longer able to provide power. For instance, when a power consumer is coupled to a computing device, the power consumer may draw continue to draw power until a user unplugs or disconnects the power consumer, often resulting in overcharging of the consumer device and/or draining the computing device's battery more than desired.

Implementations disclosed herein overcome these issues by balancing power delivery in a computing device between one or more power providers and a plurality of power consumers. A power provider and power consumers are identified, and a power delivery capability of the power provider and the power consumption demands of the power consumers are determined. Power allocation factors may be obtained that provide information for allocating power between the power provider and the power consumers. In implementations, an interactive user interface may be provided that enables a user to configure one or more of the power allocation factors, such as a charging parameter for a consumer. Using this information, a dynamic power allocation may be performed across the multiple power consumers.

By dynamically allocating power in this manner, a computing device may regulate power delivery based on the current capabilities and needs of the computing device and any other devices connected thereto. In addition, by employing an interactive user interface, a user may view and/or modify the manner in which the power delivery takes place, thereby enabling the user to more precisely adjust charging parameters as the user's computing needs change.

This approach has numerous advantages, including efficiently distributing power between one or more power providers and a plurality of power consumers. For instance, while a user may optionally identify one or more preferred charging parameters, the regulation of power in accordance with implementations may be performed in a manner that enables automatically determining which providers to use, which consumers to provide with power, and the appropriate power providing/consumption rates based on overall system loads. Furthermore, the dynamic power allocation may employ a user interface that notifies a user of changes, enabling a user to readily view a current allocation of power and/or easily input one or more instructions to enhance the user's overall experience. In addition, because the techniques described herein may continuously monitor the available power and the consumption demands across the entire system, the power may be regulated in a manner to selectively charge and/or discharge one or more devices in order to prolong the life or charge capacity of one or more components, prevent data loss, and/or maintain operational functionality of the computing device.

Accordingly, implementations provide one or more of the following (and additional) capabilities pertaining to balancing power delivery in a computing component: (1) A mechanism to dynamically allocate power based on an overall system load and one or more charging parameters; (2) a mechanism to provide a user interface enabling a user to configure one or more charging parameters and to view or input instructions for allocating power in response to a change; and (3) a mechanism to automatically regulate power to ensure proper functioning of a computing system and its components.

Example implementations are described in detail herein that are directed to techniques for balancing power delivery in a computing component. For instance, FIG. 1 shows a diagram of an example power balancing system 100, according to an implementation. As shown in FIG. 1, power balancing system 100 includes a computing device 102, a charge consumer 132, a charge provider/consumer 134, a wireless charge consumer 138, and a charge provider 142. System 100 is described in detail as follows.

In the implementation of FIG. 1, computing device 102 includes a portable unit 104 and a base unit 112. For instance, computing device 102 may comprise a portable computer with a top portion (e.g., portable unit 104) and a base portion (base unit 112) that may be attached or detachable. Although computing device 102 is illustrated herein as comprising portable unit 104 and base unit 112, techniques described herein are also directed to implementations of computing device 102 formed of a single portion and/or having additional portions. For example, computing device 102 may include a laptop or notebook computer, a tablet computer, a smartphone, a notebook computer, etc. An example computing device that may incorporate the functionality of computing device 102 is discussed below in reference to FIG. 8.

As shown in FIG. 1, base unit 112 includes one or more port(s) 114, a communication interface 116, a wireless charger 118, a power balancer 120, a charging interface 122, one or more internal power consumers 124, and a battery 126. Power balancer 120 is depicted herein as part of base unit 112 for illustrative purposes only. As described below, one or more features of power balancer 120 may be part of portable unit 104, may be distributed between portable unit 104 and base unit 112, and/or may be located in both portable unit 104 and base unit 112. Port(s) 114 are configured to enable an interface between charge consumer 132 and base unit 112 over a cable 136. In other implementations, port(s) 114 may include one or more connectors, and may provide an interface between charge provider/consumer 134 and base unit 112 over cable 136. Port(s) 114 may comprise Universal Serial Bus (USB) ports, such as USB Type A ports, USB Type B ports, and/or USB Type C ports. Port(s) 114 may also include ethernet ports, Institute of Electrical and Electronics Engineers (IEEE) 1394 ports, External Serial Advanced Technology Attachment (eSATA) ports, or any other interface which may enable data and/or power transfer between a device and base unit 112. Cable 136 may be any suitable cable or wire for transmitting data and power between charge consumer 132 or charge provider/consumer 134 and base unit 112 via the appropriate port (e.g., a USB cable, IEEE 1394 cable, ethernet cable, eSATA cable, etc.).

Charge consumer 132 comprises a device configured to consume power from computing device 102 for any purpose. For example, charge consumer 132 may include a storage device (e.g., a thumb drive, flash drive, or other memory device), a headset, a mouse, a wireless adapter, external speakers, a smartphone, a tablet, or any other peripheral device coupled to base unit 112. When coupled to base unit 112, charge consumer 132 may provide an identifier to power balancer 120, along with a power consumption demand. For example, charge consumer 132 may transmit a power consumption demand in watts, voltage and/or current (or any combination thereof). The power consumption demand may be expressed as an ideal power consumption demand (e.g., a maximum power consumption of charge consumer 132 that may deliver an enhanced user experience), a minimum power consumption demand (e.g., the minimum power required to maintain proper functionality and/or prevent data loss of the charge consumer 132), an average power consumption, or other power consumption value. In implementations, the power consumption demand from charge consumer 132 may be static (e.g., in the case of a headset or a mouse), or may change based on the operation or state of charge consumer 132 (e.g., a storage device or smartphone that may change a power consumption demand based on an activity or charge capacity level). The power consumption demand may be transmitted upon connection (e.g., upon connecting charge consumer 132 to base unit 112). In other implementations, charge consumer 132 may transmit its power consumption demand at predetermined intervals or at predefined or predetermined events (e.g., each time the consumption demand changes).

In another implementation, charge consumer 132 may not transmit a power consumption demand to base unit 112. For instance, a headset may be coupled to base unit 112 via a USB cable. Power balancer 120 may automatically determine, based on a device identifier and the USB specifications that the headset has a certain power consumption demand. For instance, in accordance with the applicable USB specifications, USB ports may be configured to provide a certain voltage and/or current to USB coupled devices. In this manner, power balancer 120 may automatically determine a power consumption demand for a consumer without receiving the consumption demand information from the consumer, instead basing the demand on a particular specification, standard, or other predetermined value.

Charge provider/consumer 134 is a device that is capable of operating as either a charge provider or a charge consumer depending on the circumstances. Charge provider/consumer 134 may be a smartphone, a tablet, a battery, or any other device that is capable of either receiving power or sending power when coupled to base unit 112. For instance, when charge provider/consumer 134 is an external battery unit, the external battery may identify itself to base unit 112. Based on any one of a number of charging parameters (e.g., a charging priority, a performance parameter such as a desired performance mode, etc.) and/or based on the overall power capabilities/demands of the system, power balancer 120 may determine that the external battery should be either a charge provider or a charge consumer. For instance, the external battery unit may send power to base unit 112 via connection 136 if power balancer 120 determines that power from the external battery should be allocated to one or more consumers (internal or external) of base unit 112. In another situation, power balancer 120 may determine that the external battery should be charged. In such a situation, power balancer 120 allocates power from another provider (e.g., battery 108, battery 126, and/or charge provider 142) to charge the external battery.

It is noted, however, that as the power capabilities/demands of the system may constantly change, power balancer 120 may change a charge provider to a charge consumer automatically and without user intervention. As discussed in greater detail below, dynamic power allocation may also optionally take into account user preferences in determining whether a device is a charge provider or a charge consumer and the circumstances regarding when a reallocation may occur.

Wireless charge consumer 138 is a device that may be electrically coupled to wireless charger 118 of base unit via a wireless charging connection 140. For instance, wireless charge consumer 138 may be a smartphone, a tablet, a headset, headphones, battery, one or more peripheral devices, accessories, etc. that may be capable of consuming power wirelessly, e.g., through inductive or electromagnetic coupling. In accordance with implementations discussed herein, wireless charging connection 140 is capable of transmitting power from wireless charger 118 to wireless charge consumer 138 using any suitable type of wireless charging interface (e.g., in accordance with the Qi® charging standard, as described in the various standards developed by the Wireless Power Consortium®, Powermat® standard developed by the AirFuel Alliance®, or any other wireless charging standard). Although described herein as included within base unit 112, wireless charger 118 may be provided externally to base unit 112 (e.g., via a USB connection or the like).

Charge provider 142 is a device configured to act as a power source for computing device 102. Charge provider 142 may provide power to charging interface 122 of computing device 102 via a suitable charging connection 144. Charging connection 144 may include any type of connection, such as one or more electrical contacts, pins, sockets, or plugs in male or female configuration, or any combination thereof. In implementations, charging connection may include a USB cable, and charging interface 122 may be a USB port (e.g., a USB Type C port). Charge provider 142 may further be operable to convert power from an alternating current (AC) power source, such as an outlet in a residence, office, or other building, into a different voltage, such as a reduced direct current (DC) voltage. Charge provider 142 is not limited to power adapters, however. In accordance with implementations, charge provider 142 may include any other power source capable of providing power to computing device 102, such as a solar sell, a battery, or any other source.

In implementations, when charge provider 142 is coupled to charging interface 122, charge provider 142 may transmit an identifier and/or a power providing capability. For instance, the identifier may include a charge provider brand, model, or any other identifier sufficient to notify computing device 102 that device coupled to charging interface 122 is a charge provider. Charge provider 142 may further transmit power delivery capabilities expressed in watts, voltage and/or current (or a combination thereof). In other implementations, e.g., where charge provider 142 is coupled via a USB cable, the power delivery capabilities may be determined based on power delivery specifications set forth in the applicable USB standards, as described earlier. In another example, power balancer 120 may obtain or infer a power providing capability based on one or more characteristics, such as a state/voltage of one or more pins to which charge provider 142 is coupled, a current level received from charge provider 142, a resistance of a designated circuit, or any other suitable manner As shown in FIG. 1, base unit 112 may further include internal power consumer(s) 124. Internal power consumer(s) 124 include one or more internal components of base unit 112 that consume power during operation of computing device 102. Internal power consumers 124 may also include internal power consumers of portable unit 104, described below. For instance, internal power consumer(s) 124 may include a central processing unit (CPU), one or more graphics processing units (GPU), other processing units, a keyboard, speakers, storage devices, a backlight, etc. While certain internal power consumer(s) 124 may have static power consumption demands (e.g., a keyboard or backlight), it is noted that other internal power consumer(s) 124 may have dynamically changing power consumption demands. For instance, a CPU and/or GPU may need additional power in order to perform quicker processing functions (e.g., during execution of a high-intensity gaming application), and may reduce a power consumption demand in other situations (e.g., during execution of a word processing application). In accordance with implementations, power balancer 120 may determine the change in power consumption demands of internal power consumer(s) 124 constantly (e.g., in real-time or in predetermined intervals) and reallocate power from a power provider to the power consumers (both internal and external) as appropriate.

Battery 126 includes any type of depletable power source suitable for providing stored energy to any of the components described herein. Battery 126 may have the form of an individual battery or a battery pack, and may include, but not be limited to, lithium batteries, lithium ion batteries, nickel metal halide batteries, nickel cadmium batteries, solar batteries, alkaline batteries, mercury batteries, etc. In implementations, battery 126 may be removable from a housing of base unit 112, may be permanently installed, or may be external to base unit 112. In another implementation, battery 126 may be rechargeable (e.g., via charge provider 142), or may be disposable. In accordance with techniques described herein, battery 126 may act as either a power provider or a power consumer. For instance, when power balancer 120 employs battery 126 to provide power to other components of computing device 102, battery 126 acts a power provider. In other instances, such as when an external power source may be coupled (e.g., charge provider 142), battery 126 may receive power from the power source to increase an amount of stored energy, thus acting as a power consumer. In implementations, power balancer 120 may determine whether battery 126 acts as a power consumer or a power provider, depending on the power capabilities and demands of the overall system and/or one or more power allocation factors described in greater detail below. In other implementations, power balancer 120 may determine that battery 126 need not provide power or consume power in a given arrangement (e.g., when an external power source is connected and battery 126 need not be charged or discharged).

In implementations, portable unit 104 may comprise a detachable portion of computing device 102 that includes additional computing components, including but not limited to a user interface 106, a battery 108, and a communication interface 110. For instance, as shown in FIG. 1, portable unit 104 may comprise a screen or display portion of computing device 102 (e.g., a top portion of a notebook computer), or a tablet or other type of display that may be coupled and decoupled to base unit 112 via communication interface 110. When portable unit 104 is coupled to base unit 112, portable unit 104 may act as a display or screen of base unit 112, such that a user may access applications and/or otherwise interact with data stored in base unit 112 via user interface 106. When portable unit 104 is detached from base unit, portable unit 104 may continue to function as a standalone computing device (e.g., a tablet computer). Accordingly, although not shown herein, portable unit 104 may contain one or more internal power consumers (e.g., similar to internal power consumers 124 described above), including but not limited to one or more processors, storage devices, graphics components, etc. separate from base unit 112.

In implementations, portable unit 104 may be attached to base unit 112 in a number of ways. For instance, portable unit 104 may be attached to base unit via pins, clips, brackets, magnets, or any other manner appreciated by those skilled in the art enabling a relatively effortless detachment. Although illustrated herein as being detachable, implementations herein are not so limited. Portable unit 104 may be fixed to base unit 112, such that the portable unit 104 may not be detached. For instance, portable unit 104 may be pivotably mounted on base unit 112 (e.g., via pins, screws, bolts, or the like).

User interface 106 includes any type of interface suitable for enabling interaction between a user and portable device 104 and/or base unit 112. For instance, user interface 106 may be any one of a graphical user interface, audio interface, haptic interface, a touch screen, a mouse, a trackpad, a microphone, or any other interface a user may use to interact with portable device 104 and/or base unit 112. User interface 106 may enable configuration of one or more power delivery settings, such as a charging parameter, in accordance with implementations described herein. User interface 106 may further be configured to provide notifications and/or real-time dynamic power allocation information (e.g., via a pop-up or executable icon or the like on a display).

Battery 108 is similar to battery 126. In implementations, battery 108 may have a smaller charge capacity than battery 126. As a result, battery 108 be sized smaller and/or lighter than battery 126, thus increasing the portability of portable unit 104 when decoupled from base unit 112. When portable unit 104 is coupled to base unit 112, battery 108 may act as either a power provider or a power consumer (or neither), depending on the dynamic allocation by power balancer 120. For example, battery 108 may provide power to any of the components of computing device 102 (e.g., those in portable unit 104 and/or base unit 112), or may consume power where power balancer 120 determines that the energy stored in battery 108 should be increased. Battery 108 may also be charged and/or discharged via an external power source (not shown) coupled to portable unit 104, any of the components of portable unit 104, other peripheral components (not shown) coupled to portable unit 104, and/or via communication interface 110. In other implementations, portable unit 104 may not comprise battery 108, and may be configured to obtain power from base unit 112 via communication interface 110, or via an external power source (not shown).

Communication interface 110 and communication interface 116 may form any type of electrical (and mechanical) coupling between portable unit 104 and base unit 112 via a connection 130. For instance, communication interfaces 110 and 116 may comprise pins, wires, plugs, sockets, electrical contacts, male and/or female connectors, wireless interfaces, optical interfaces, wireless interfaces, or any combination thereof. Communication interfaces 110 and 116 are configured to enable the communication of electrical signals, including the transmission of video signals, audio signals, and/or power, between portable unit 104 and base unit 112. For instance, power balancer 120 may cause power from a charge provider (e.g., battery 126, charge provider/consumer 134, and/or charge provider 142) to be allocated to one or components of portable unit 104 (e.g., battery 108, user interface 106, and/or any other internal components). In other implementations, power balancer 120 may provide power from battery 108 to one or more of the components of base unit 112 via communication interfaces 110 and 116, or other components/devices connected thereto (e.g., charge consumer 132).

Communication interfaces 110 and 116 may also be act as display interfaces enabling the display of power allocation information from power balancer 120 on user interface 106. For instance, communication interfaces 110 and 116 may receive power provider identities, power provider delivery capabilities, power consumer identities, and power consumer demand information from power balancer 120. Communication interfaces 110 and 116 may transmit such information to user interface 106 to display such information, along with one or more power allocation factors (e.g., charging priorities, a power parameter, a performance parameter, etc.) that may be user configurable. In an example, communication interfaces 110 and 116 may also enable user interface 106 to display one or more user interactive controls (e.g., buttons, sliders, knobs, etc.) for allocating power from one or more providers to one or more consumers (e.g., by setting or modifying one or more power allocation factors). Communication interfaces 110 and 116 may obtain user inputted configuration information from user interface 106, or via one or more other input devices (e.g., a mouse, trackpad, a keyboard, etc.), and provide the allocation information to power balancer 120 for implementation and/or storage as described herein.

Note that herein, when "portable" is used in reference to objects, "portable" indicates such objects have a weight and size that enable carrying in one hand by humans. Examples of portable devices include smartphones, laptop computers, notebook computers, tablet devices, batteries, battery packs, headsets, earphone devices, some external hard drives, keyboards, and the base and portable units of a two-piece computing device (e.g., a Microsoft Surface®).

Figure 2:
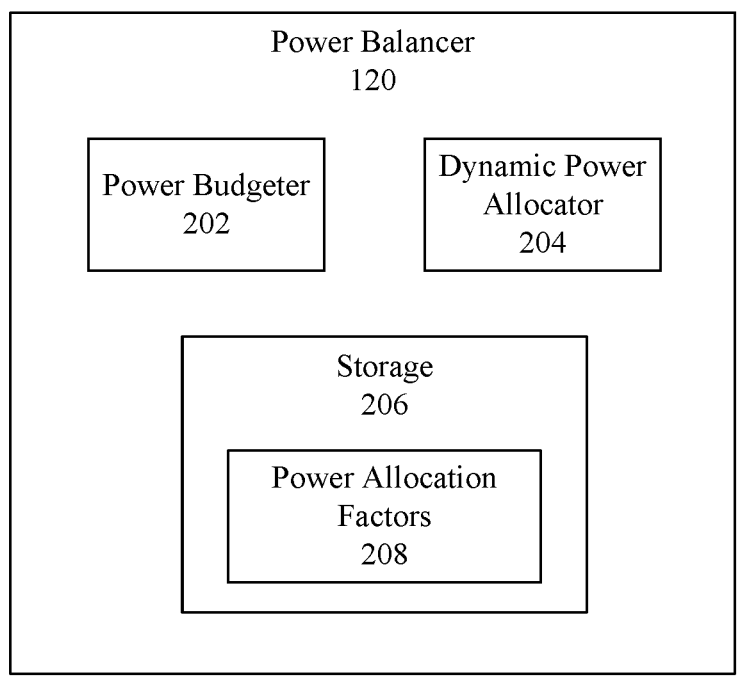
FIG. 2 shows a block diagram of a power balancer, according to an example implementation.

Power balancer 120 is configured to dynamically allocate power from a power provider (e.g., charge provider 142, an internal battery, and/or an external battery) to one or more power consumers (e.g., internal power consumer(s) 124, portable unit 104, an internal battery, an external battery, etc.). In implementations, power balancer 120 may be responsible for regulating power delivery of an entire system (e.g., computing device 102 and each of its providers/consumers). Although power balancer 120 is illustrated as being implemented in base unit 112, this implementation is only illustrative. One or more features of power balancer 120 may be similarly located in portable unit 104. Similarly, one or more features of power balancer 120 may also be located in each of portable unit 104 and base unit 112 or distributed between portable unit 104 and base unit 112. For instance, when portable unit 104 is decoupled from base unit 112, a power balancer in portable unit 104 (not shown) may be configured to carry out the techniques described herein to regulate power delivery in portable unit 104. In another implementation, a power balancer in portable unit 104 (not shown) may be configured to carry out the techniques described herein when portable unit 104 is coupled to base unit 112 to regulate power delivery of the one or more providers and consumers of computing device 102. Power balancer 120 may operate in various ways to balance power delivery in a computing component. For example, FIG. 2 shows a block diagram of power balancer 120, according to an example implementation. Power balancer 120 includes a power budgeter 202, a dynamic power allocator 204, and a storage 206.

In an implementation, storage 206 may include one or more power allocation factors 208. Storage 206 and/or power allocation factors 208 may be either local to power balancer 120 (e.g., within portable unit 104 or base unit 112), external (e.g., on an external storage device coupled to computing device 102), or be located remotely (e.g., on a cloud-based server). For example, storage 206 and/or power allocation factors 208 (and/or any other data obtained by or otherwise utilized by power balancer 120) may be obtained by a service executing on computing device 102 from one or more remotely located storages (e.g., cloud-based storages), through a suitable network interface or the like. In an implementation, data stored by storage 206 and/or power allocation factors 208 may be saved and exported to one or more other computing device(s) (not shown) implementing one or more of dynamic power allocation techniques described herein. For instance, data contained within storage 206 or power allocation factors 208 may be exported selectively to one or more of a user device, or may be exported to a larger group of devices (e.g., a plurality of computers within an organization). In another implementation, information obtained or utilized by power balancer 120 may be imported (e.g., from an external storage, from a cloud-based storage, or any other network-accessible source) into computing device 102. The features of power balancer 120 of FIG. 2 are described as follows.

Power budgeter 202 may identify the power providers and power consumers of computing device 102. Power budgeter 202 may further be configured to determine the overall power providing capabilities of the identified providers and the power consumption demands of the identified consumers. Dynamic power allocator 204 may dynamically distribute the available power to one or more power consumers based on the capabilities/demands of the overall system (e.g., computing device 102 and each of its coupled providers/consumers). Dynamic power allocator 204 may also obtain one or more power allocation factors 208 from storage 206 (e.g., charging parameters set by a user through a user interface, such as a charging priority, a power parameter, a performance parameter, etc.) in dynamically allocating power from a provider to one or more consumers coupled to computing device 102.

In accordance with implementations discussed herein, dynamic power allocator 204 may determine which provider(s) to use for allocating power, the power levels at which each provider may transmit power, which consumers are to receive power, the power levels at which each consumer desires to consume power, and the amount of power to distribute from one or more providers to each consumer. For instance, dynamic power allocator 204 may determine to use a certain power provider (e.g., charge provider 142 or an internal/external battery, or a combination thereof) to distribute across the consumers of computing device 102 based on a number of factors, such as the overall load on a system and/or power allocation factors (e.g., user preferences, charging parameters, thermal considerations, or other external factors such as tier-based or time-of-day utility pricing if an external charge provider is being used, etc.). In other implementations, dynamic power allocator 204 may determine that an excessive system load exists (e.g., the overall power consumption demands are greater than the power delivery capabilities), and automatically reduce and/or terminate a power transmission to one or more charge consumers (e.g., disabling a USB charge consuming device). In yet another implementation, power balancer 120 may be configured to notify a user (e.g., via user interface 106) when a power budget has changed, thus enabling the user to have visibility into the dynamic power allocation as well as enabling the user to modify a charging parameter (a charging priority, a power parameter, a performance parameter, etc.) in response to the changed power budget. In this manner, a user is able to maintain enhanced control over which devices consume power and how much power each device may consume.

Dynamic power allocator 204 may operate in a number of ways to allocate power from one or more power providers to one or more power consumers. For instance, dynamic power allocator 204 may distribute power based on one or more priorities for any number of power providers and any number of power consumers in a system. Dynamic power allocator 204 may obtain an indication of the identities of one or more power providers and power consumers coupled to computing device 102 from power budgeter 202. Dynamic power allocator 204 may further obtain power delivery capabilities and power consumption demands of the providers and consumers, respectively, from power budgeter 202. Dynamic power allocator 204 may be configured to select first a power provider (of a plurality of providers) based on a charging priority (e.g., by selecting the power provider with the highest priority). Power from the first power provider may be allocated to one or more consumers based one or more charging priorities, e.g., by allocating power to the highest priority consumer first. If power from the first power provider is still available after the allocation to the highest priority consumer, dynamic power allocator 204 may allocate power from that provider to the next highest consumer, and so on, until the highest priority provider has no further power available for allocation based on its power providing capability. In this event, one or more additional providers (e.g., with the same or next highest priority) may be selected for allocating power to the next highest priority consumer, and so on, until each such provider has no further power available for allocation. Dynamic power allocator 204 may allocate power in this iterative manner until all of the available power from the power providers have allocated and/or all of the power consumers have received sufficient power to satisfy their respective consumption demands It is noted that the allocation of power by dynamic power allocator 204 is not limited to these illustrative implementations, but may also include any other manner of distributing power between one or more providers to one or more consumers. For instance, dynamic power allocator 204 may regulate power in computing device 102 based on charging parameters (a charging priority, a power parameter, a performance parameter, etc.) provided via a user interface, explained in greater detail in Section II.A. Dynamic power allocator 204 may also regulate power to preserve a charge capacity of an internal battery, explained in greater detail in Section II.B. In another implementation, power may be regulated in a manner that may correlate a charge/discharge rate of multiple internal batteries, explained in greater detail below in Section II.C. In yet another example, dynamic power allocator 204 may regulate power delivery in response to determining that a charge provider is providing power below a threshold value, explained in more detail below in Section II.D. It will be understood and appreciated that the example implementations discussed herein are not intended to be read in a vacuum. It is contemplated that any of example implementations, or features discussed therein, may be combined with any other implementations.

A. Dynamic Power Allocation with User Interaction Implementation

Figure 3:
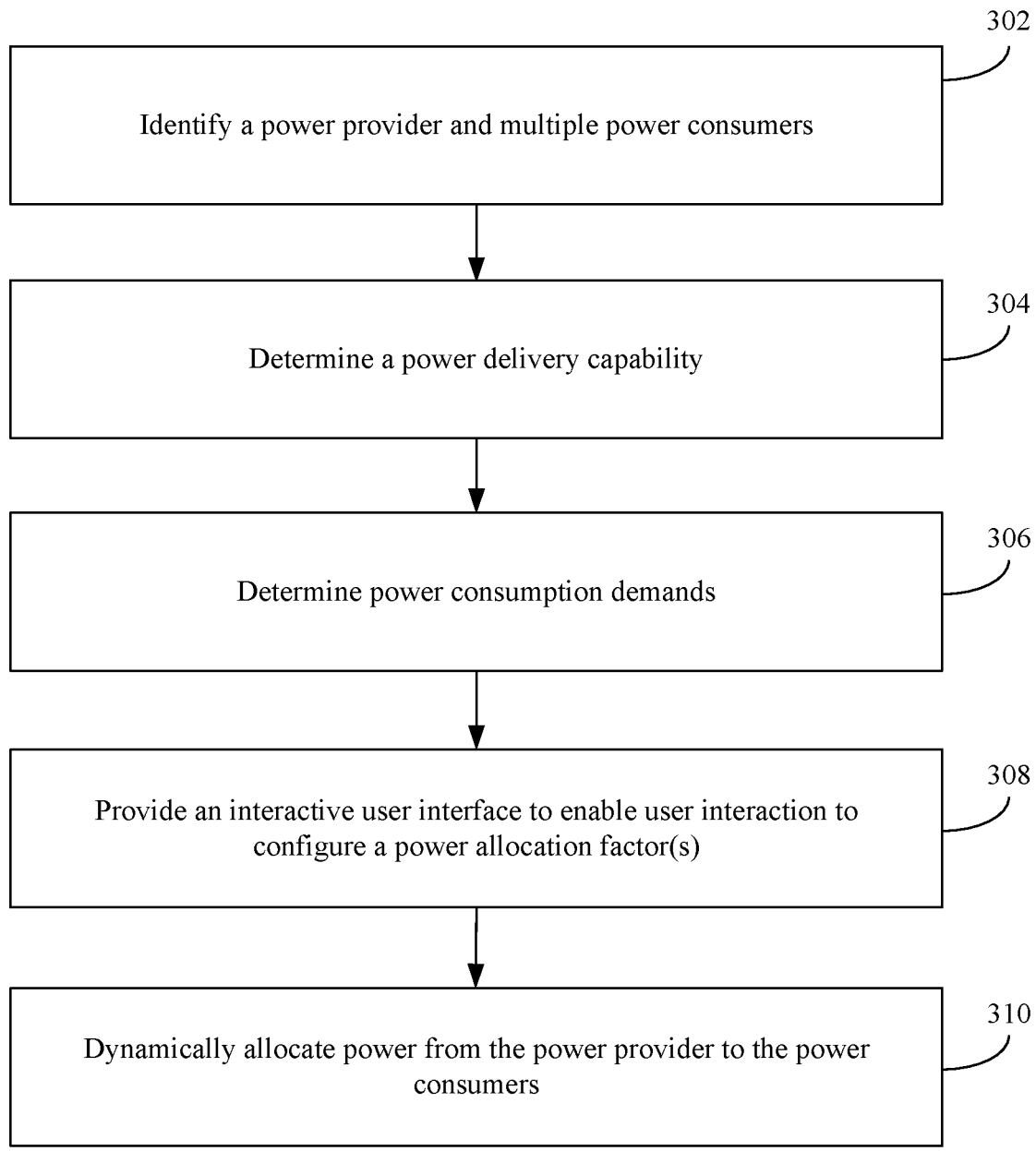
FIG. 3 shows a flowchart for dynamically allocating power from a power provider to power consumers, according to an example implementation.

In implementations, power balancer 120 may dynamically allocate power between a power provider and one or more power consumers. Power balancer 120 may dynamically allocate the available power in various ways. For example, FIG. 3 shows a flowchart 300 for dynamically allocating power, according to an example implementation. In an implementation, flowchart 300 may be implemented by system 100 and power balancer 120 as shown in FIGS. 1 and 2.

Accordingly, for purposes of illustration, flowchart 300 of FIG. 3 is described with continued reference to both FIGS. 1 and 2. For instance, system 100 and power balancer 120 may operate according to flowchart 200. Note that the steps of flowchart 300 may be performed in an order different than shown in FIG. 3 in some implementations. Furthermore, not all steps of flowchart 300 need to be performed in all implementations. Further structural and operational implementations will be apparent to persons skilled in the relevant art(s) based on the following description regarding system 100, power balancer 120, and flowchart 300.

Flowchart 302 begins with step 302. In step 302, a power provider and multiple power consumers are identified. For instance, with reference to FIGS. 1 and 2, power budgeter 202 may identify each device or component coupled to computing device 102 (both internal and external) and determine whether each identified device or component is a power provider or a power consumer. In doing so, power budgeter 202 may identify any number of power providers and power consumers that may be coupled to computing device 102. For instance, although two external charge consumers (charge consumer 132 and wireless charge consumer 138), one external charge provider/consumer 134, one charge provider 142, and two internal charge providers/consumers (battery 108 and battery 126) are illustrated in FIG. 1, it will be appreciated that any number of charge providers and/or charge consumers, whether internal or external, may be present and identified by power budgeter 202 in accordance with implementations.

For example, when a power provider is coupled to computing device 102, the power provider transmits at least an identifier to power budgeter 202. Based on the identifier, power budgeter 202 may determine that charge provider/consumer 134 and/or charge provider 142 are power providers capable of providing power to one or more consumers of computing device 102. In a similar manner as described above with respect to power providers, power consumers may transmit an identifier to power balancer 120 upon the power consumer being coupled to computing device 102. For instance, power budgeter 202 may obtain an identifier of charge consumer 132, wireless charge consumer 134, and/or charge provider/consumer 134 upon those devices being coupled. Based on the identifier, power budgeter 202 may determine that charge consumer 132, wireless charge consumer 134, and/or charge provider/consumer 134 are power consumers of computing device 102. Furthermore, in implementations where portable unit 104 may be detachably attached to base unit 112, portable unit 104 may similarly transmit an identifier to power budgeter 202. Power budgeter 202 may therefore determine that one or more components of portable unit 104 are additional power consumers of computing device 102.

In addition, storage 206, in a suitable data structure such as a database or the like, may store an identifier corresponding to each of the internal power consumer(s) 124. For example, since the identity of internal power consumer(s) 124 is typically static for computing device 102, the internal power consumer(s) 124 need not transmit an identifier to power budgeter 202 each time a dynamic allocation takes place in implementations, if at all. Rather, the identities of each of the internal power consumers may be stored in storage 206 that may be accessed by power budgeter 202 in accordance with the techniques described here. In another implementation, an identifier corresponding to each of the internal power consumer(s) 124 may be transmitted at predetermined intervals and/or events (e.g., each time a dynamic power allocation occurs or at system start-up).

It is noted that certain devices or components (e.g., charge provider/consumer 134, battery 108, and/or battery 126) may be either a power provider or a power consumer. In such situations, power budgeter 202 may identify the device or component as both a potential power provider or a potential power consumer. For example, charge provider/consumer 134 is an external battery at 50% capacity, power budgeter 202 may identify charge provider/consumer 134 as both a potential power provider and a potential power consumer. As will be described in greater detail below, dynamic power allocator 204 may determine whether to use such device as either a power provider a power consumer based, at least in part, on the overall power capabilities/demands of the system, and/or power allocation factors that may be configured via a user interface.

In implementations, because battery 108 and/or battery 126 may be internal and/or integral to computing device 102, battery 108 and/or battery 126 need not transmit an identifier. Rather, the identities of battery 108 and/or battery 126 may be stored in computing device 102 (e.g., in a suitable data structure of storage 206) that may be accessed by power budgeter 202. In another implementation, an identifier corresponding to battery 108 and/or battery 126 may be transmitted at predetermined intervals and/or events (e.g., each time a dynamic power allocation occurs or at system start-up). Upon obtaining the identifier from storage 206 or from battery 108 and/or 126, power budgeter 202 may accordingly determine that one or more of battery 108 and/or battery 126 is presently installed and operable as either a power provider or a power consumer.

In step 304, a power delivery capability of a power provider is determined. For instance, with reference to FIG. 2, power budgeter 202 determines the power delivery capabilities of each power provider (and potential power providers) coupled to computing device 102. As shown in FIG. 1, power budgeter may determine a power delivery capability of battery 108, battery 126, charge provider/consumer 134, and/or charge provider 142, depending on which devices or components are coupled to and/or installed in computing device 102.

Power budgeter 202 may determine a power delivery capability in a number of ways. For instance, power budgeter 202 may receive a power delivery capability from a power provider. As an example, if charge provider 142 is an AC power adapter, charge provider 142 may transmit its power delivery capability (in watts, voltage, and/or current) to power budgeter 202. In the event that a power provider is a device that can transmit stored energy, such as battery 108, battery 126, or charge provider/consumer 134, the power provider may also be configured to transmit an indication regarding the amount of stored energy. For example, battery 108 may transmit an indication that it contains 10% of its capacity, while battery 126 may transmit an indication that it contains 90% of its capacity. In implementations, power budgeter 202 may be configured to determine the power delivery capabilities of each of the power providers and potential power providers coupled to computing device 102.

In some instances, a power delivery capability of a power provider may not be static. For example, if a charge provider/consumer 134 and/or charge provider 142 is coupled to computing device 102 via a USB Type C coupling, charge provider/consumer 134 and/or charge provider 142 may be capable of providing or receiving power at a plurality of different power levels. For instance, in accordance with the specifications applicable to USB Type C couplings, a power delivery level may be negotiated between a power provider and computing device 102. In such a scenario, power budgeter 202 may determine each available power delivery capability for each power provider based on a plurality of levels transmitted by the power provider and/or based on the applicable USB standards.

In another instance, an external power provider (e.g., charge provider/consumer 134 or charge provider 142) may not transmit a power delivery capability at all. For example, power provider manufacturers may rely on a default power level in accordance with an applicable communication protocol (e.g., a USB standard). In these instances where a power delivery capability is not transmitted, power budgeter 202 may nevertheless automatically determine a power delivery capability for the power provider based on the default level provided by such communication standards, or based on a predetermined value pre-stored for unknown power providers.

In accordance with implementations, a power delivery capability for a power provider may be transmitted once upon coupling (e.g., for an external power provider), may be transmitted at predetermined intervals (e.g., when performing a dynamic reallocation), or at predetermined events (e.g., at system startup or when a device is coupled or decoupled). By constantly determining power delivery capabilities of each available provider, power balancer 120 may more efficiently allocate the available power across the power consumers.

In step 306, power consumption demands are determined for the power consumers. As described earlier, a power consumer (e.g., charge consumer 132, charge provider/consumer 134, wireless charge consumer 138, battery 108, and/or battery 126) may transmit a power consumption demand in watts, voltage, current, and/or a charge capacity (or a combination thereof) in implementations. The power consumption demand may be expressed in any manner, e.g., as a desired power consumption, an ideal power consumption demand (e.g., a maximum power consumption of a power consumer that may enable the charge consumer to deliver an enhanced user experience) and/or a minimum power consumption demand (e.g., the minimum power required to maintain proper functionality and/or prevent data loss of the power consumer). In implementations, a power consumer may be capable of operating at more than one power level (e.g., when connected via a USB Type C coupling). In such scenarios, the power consumer may transmit a plurality of power consumption demand levels. In accordance with techniques described later, dynamic power allocator 204 may determine an appropriate power to provide such a consumer by based on the power allocation factors and the overall state of the system.

The power consumption demand from a power consumer may be static (e.g., in the case of a headset or a mouse), or may change based on the operation (e.g., a memory device or smartphone that may change a power consumption demand based on an activity level) and/or charge level of the power consumer (e.g., where the power consumer is a battery that has reached a full capacity level). Accordingly, the power consumption demand may be transmitted once (e.g., upon connecting a power consumer to computing device 102), may be transmitted at predetermined intervals, or may be transmitted each time the consumption demand of the consumer changes.

In other instances, a power consumer may not transmit a power consumption demand to computing device 102. For instance, where a power consumer is coupled via a USB cable, power budgeter 202 may automatically determine, based on a device identifier and the applicable USB specifications, that the power consumer has a certain default power consumption demand. In this manner, power budgeter 202 may automatically determine power consumption demands for consumers without receiving the consumption demand information.

In yet another scenario, such as for internal power consumer(s) 124 that have a static power consumption demand (e.g., a keyboard, a trackpad, a backlight, etc.), the power consumption demand may be stored in storage 206 that may be accessed by power budgeter 202. Because the power consumption demand of such devices may not change, or not change often, power budgeter 202 may rely on stored power consumption demand information rather than receiving such information from the power consumers. For other internal power consumer(s) 124 with dynamic power consumption demands, such as one or more CPUs or GPUs, the power consumption demand may increase or decrease depending on a user activity level. For example, a CPU or GPU may have an increased power consumption demand during execution of high activity applications (e.g., gaming or multimedia applications) compared to low activity applications (e.g., word processing applications). For such devices, power consumption demands of the power consumers may be transmitted constantly (e.g., in real-time, at predetermined intervals, or upon a change in the consumption demand) to minimize any disruption in functionality or the user experience. Although dynamic power consumers have been identified as CPUs or GPUs, it is noted that such power consumers are provided only as examples. Computing device 102 may contain any other internal power consumer, as well as external power consumers, that may have constantly changing power consumption demands (e.g., based on any number of factors, such as processing and/or activity levels).

In step 308, an interactive user interface is provided to enable user interaction to configure one or more power allocation factors. For instance, with continued reference to FIG. 1, user interface 106 may provide an interface enabling a user to configure one or more power allocation factors 208. Power allocation factors 208 may be stored in storage 206 in any suitable manner (e.g., in a data structure, such as a database or the like).

Figures 4, 5:
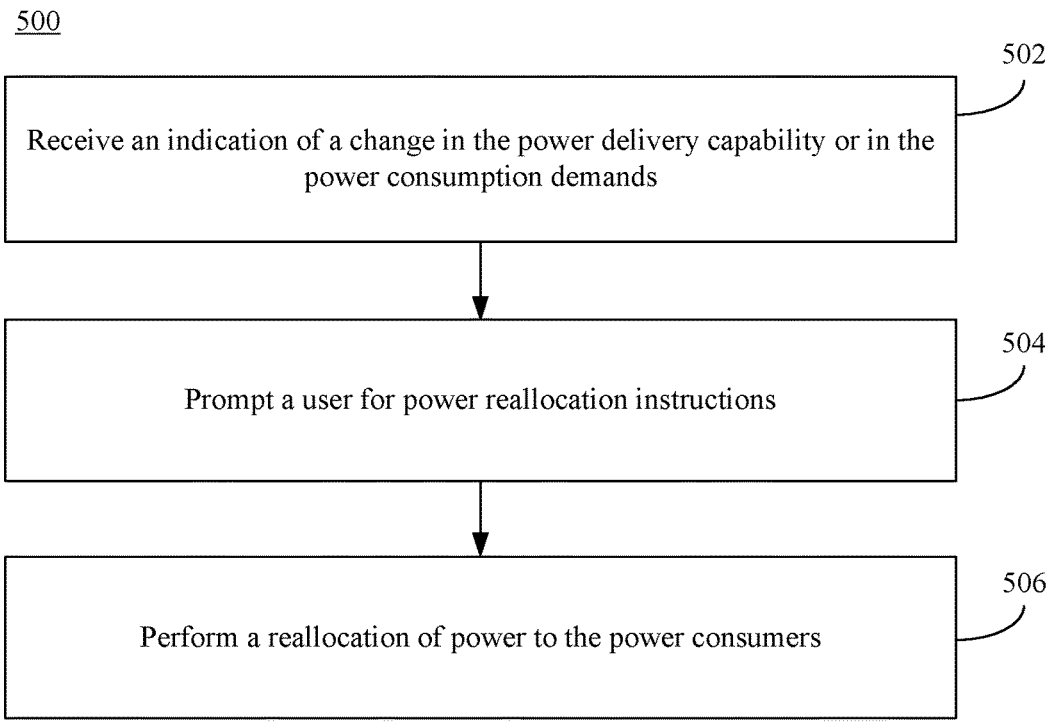
FIG. 4 shows an example user interface enabling a user to view and/or modify charging parameters, according to an example implementation.
FIG. 5 shows a flowchart for performing a reallocation of power to power consumers, according to an example implementation.

An interactive user interface in accordance with implementations may be provided in various ways. For example, FIG. 4 depicts an example user interface 400 for enabling a configuration of one or more power allocation factors. User interface 400 is an example of user interface 106 described above with reference to FIG. 1. As illustrated in example user interface 400, a plurality of power allocation factors is provided for a given consumer (e.g., "Consumer A"). As shown in FIG. 4, the configurable power allocation factors include one or more charging parameters, such as a device priority, a duration, a charging rate, and/or a target percentage. Although not shown herein, configurable power allocation factors may include one or more other charging parameters, such as a power parameter or a performance parameter (e.g., a desired performance mode or level), described later. For each configurable charging parameter, user interface 400 may provide an adjustable value and/or a unit of measurement by enabling user interaction with one or more corresponding user interface controls. For example, user interface 400 may enable a user to assign a charging priority of the selected power consumer, edit a charging duration, edit a charging rate or charging speed, and/or edit a target charging percentage. For instance, a user may decide that charging a particular consuming device is a high priority, and interact with a user interface control (e.g., a button, a pull-down menu, a slider bar, a check box, etc.) of user interface 400 to assign a priority of "1" for the consuming device. Similarly, user interface 400 may enable a user to modify other charging parameters illustrated in FIG. 4, e.g., between a minimum value and/or a maximum value, in any suitable manner A user may wish to modify charging parameters for a number of reasons, such as to increase or decrease power consumption of a connected device (e.g., to charge a smartphone or a tablet), increase the available power for internal power consumers (e.g., CPUs or GPUs) to enhance the user experience, maximize/minimize power consumption from an external AC power source (e.g., based on a tier-based or time-of-day utility pricing), or any other reason.

As one example, a user that may be scheduled to enter a location where AC power may be limited or unavailable. For instance, a user that may be soon boarding an airplane may utilize user interface 400 to direct power from an external power provider (e.g., an A/C adapter plugged into a power outlet at an airport terminal) to one or more desired batteries. As an illustrative example, user interface 400 may enable a user to selectively charge battery 108 or an external battery device coupled to computing device 102 prior to charging internal battery 126. In another scenario, a user may wish to charge the internal battery 126 before charging any other batteries, or to charge all coupled batteries at equal rates.

In another example, interactive user interface 400 may also provide an ability for a user to enable or disable a power allocation factor relating to consuming power based on a current utility rate. For instance, in many locations, power utility companies may offer power at reduced utility rates during off-peak times and increased utility rates during on-peak times, or other tier-based pricing. In implementations, interactive user interface 400 may enable a user to identify such peak times or tier-based pricing scheme, and optionally specify or modify one or more charging parameters (a charging priority, a power parameter, a performance parameter, etc.) for a provider or consumer based on certain off-peak or on-peak times, or based on different pricing tiers.

In another example, user interface 400 may enable a configuration of one or more schedule-based charging parameters. A schedule-based charging parameter may enable obtaining power from one or more providers or providing power to one or more consumers based on certain periods during the day or week (or any other time period). A schedule-based charging parameter may further include specifying one or more other charging parameters (a charging priority as shown in example user interface 400, a power parameter, a performance parameter, etc.) for one or more time periods. For instance, a user may specify a priority, duration, charging rate, a target percentage, and/or a desired performance level during a first time of day (e.g., at 8:00 a.m.), a different priority, duration, charging rate, a target percentage and/or desired performance level during a second time of day (e.g., at 6:00 p.m.), etc. In this manner, a user may customize the utilization of certain providers or consumers (or groups thereof) with any level of desired granularity.

As shown in user interface 400, a power consumer may also be assigned to a particular category of devices (e.g., "Category 1" as depicted herein). A category may be based, for example, on an identity of the power consumer and/or a coupling between the power consumer and computing device 102. For example, each power consumer coupled to computing device 102 via a USB Type A connection may be assigned to a USB Type A category, and each power consumer coupled to computing device 102 via a USB Type C connection may be assigned to a USB Type C category. Similarly, wireless charge consumer 138 may be assigned to a Wireless Charge Consumer category. Internal power consumer(s) 124 may be assigned to an Internal Power Consumer category, or may assigned in a more granular fashion (e.g., processors, input devices, output devices, etc.). The list of categories is not intended to be exhaustive, and is intended to cover any other categorization known and appreciated to those skilled in the relevant art.

User interface 400 may further display preassigned values (e.g., default values) for a power consumer. For instance, based on a device identity or a category assigned to a given device, one or more default or control values or positions for various charging parameters (e.g., a charging priority, a power parameter, a performance parameter, etc.) may be displayed in user interface 400. User interface 400 may display one or more user interface user controls enabling a user to modify a preassigned value for a displayed charging parameter for a given device and/or an entire category of devices. The one or more user interface controls may include toggles, arrows, drop down lists or menus, alphanumeric input fields, slider bars, knobs, buttons, or any other suitable manner of modifying a preassigned value for a charging parameter or inputting a charging parameter in user interface 400 for a power consumer or a category of devices. In accordance with an implementation, a user may modify the one or more charging parameter values upon selecting an appropriate icon or button (e.g., an "edit" button"). The user interface may also enable a user to save the one or more charging parameter values by selecting another icon or button (e.g., a "save" button). In implementations, user interface 400 may further display an icon or button (e.g., a "default" button") enabling the preassigned values to be reassigned or restored to one or more charging parameters.

Upon saving a charging parameter for a particular device or a category of devices, the charging parameter is stored in storage 206 as one of power allocation factors 208. As will be described later, dynamic power allocator 204 may reference power allocation factors 208 in determining the manner in which power is dynamically allocated between a power provider and various power consumers of computing device 102. Furthermore, when a user modifies one or more charging parameters for a power consumer and the user later disconnects the power consumer, the stored charging parameter values may be obtained and optionally displayed to the user upon reconnection of the power consumer. In another implementation, where a user decides to modify one or more charging parameters across an entire category of devices, the stored charging parameters for the category of devices may be utilized when a new (e.g., previously unconnected) power consumer in a category of devices (e.g., USB Type C devices) is coupled to computing devices. In this manner, a user need not reconfigure charging parameter values for power consumers or categories of power consumers, thereby saving the user time in managing the dynamic power delivery in computing device 102.

It is noted, however, that the charging parameters are only examples, and may include other user adjustable charging parameters as well, or may not include every charging parameter illustrated in FIG. 4 for each power consumer. Furthermore, user interface 400 may also include one or more user interface controls enabling a user to disable power consumption by a selected power consumer to conserve power and/or enable additional power to be allocated to other power consumers. In another implementation, a user may set one or more charging parameters to a minimum or zero value, thereby similarly disabling power consumption by the selected power consumer.

In accordance with another implementation, user interface 400 may further display a user interface control (e.g., a slider, toggle, selector, etc.) enabling a user to select or modify a charging parameter relating to power or performance, including but not limited to a power parameter or a performance parameter (e.g., a desired performance mode). For example, a user may select one of a plurality of preset power modes in which an AC power source is utilized or a mode in which computing device 102 is utilizing one or more batteries as a power source. In another implementation, preset modes may include a performance mode which may assign an increased priority level to processing components (e.g., CPUs and GPUs of computing device 102) and a balanced mode that balances charging parameters across the coupled power consumers, or one more modes between a performance mode and a balanced mode. Each preset power mode may contain different power allocation factors, such as the illustrative charging parameters of FIG. 4 that may be separately configurable by a user in a similar manner as described above. As a result, a user need not expend additional time in reconfiguring charging parameters previously saved for a particular power mode.

Although many power allocation factors 208 may be configurable by a user, power allocation factors 208 may also include one or more factors that may not be user configurable. For instance, power allocation factors 208 may include thermal limits for a power consumer, power provider, or computing device 102 that may affect the allocation of power, examples of which are described in further detail elsewhere herein. Power allocation factors 208 may also include additional constraints, such as preventing data loss by maintaining a minimum power allocation to one or more power consumers. Such additional power allocation factors 208 may or may not be displayed or configurable via user interface 400.

Although user interface 400 may enable the configuration of power allocation factors for a power consumer or a category of power consumers (e.g., via the charging parameters illustrated in FIG. 4), user interface 400 may also display power allocation factors for charge providers that may (or may not be) modified by a user via a user interface control. For instance, user interface 400 may permit a user to prioritize a particular charge provider (e.g., an AC power source) to utilize when an AC power source is present, or prioritize a particular battery (e.g., battery 126) when an AC power source is not present. In another implementation, a user may desire to utilize a particular power provider until the provider has been depleted to a threshold capacity, upon which a different charge provider is to be utilized. The user configuration of power providers described herein is only an example, and may encompass any other parameter relating to a manner in which a power provider may be selected and/or used to allocate power.

In implementations, user interface 400 may further be configured to display notifications (not shown) to a user. For instance, when a power provider or a power consumer is connected to or disconnected from base unit 102, user interface 400 may be configured to display a notification of the connection or disconnection in a suitable manner, such as a pop-up alert or the like. In another implementation, one or more notifications may be presented on user interface 400 in response to a change in a power delivery capability (e.g., a delivery capability being below a threshold value) or a change in the power consumption demands (e.g., an excessive power consumption demand above a threshold value). Upon such a change in the coupled power providers or consumers, or their respective capabilities and consumption demands, user interface 400 may further display, either automatically or in response to a further user interaction, one or more charging parameters as illustrated in FIG. 4 for user display and/or configuration.

In another implementation, real-time power allocation information may be displayed via user interface 400. For example, user interface 400 may display an indication of the currently allocated power. In implementations, an indication of the dynamically allocated power may include a current rate of charge, a power consumer charge capacity, an indication of a charge completion time (e.g., an estimated amount of time to reach a target charge capacity or a full charge capacity), current tier-based pricing information of a utility company from which power is being obtained, an indication that power allocated to a power consumer will be enabled, terminated, increased, and/or decreased upon a current or upcoming tier-based pricing schedule. Such indications may be displayed in any manner in one or more user interface features, including tables, text boxes, meters, gauges, etc. Indications may be provided at user-set intervals, at predetermined intervals, or upon an occurrence of a predefined event (e.g., a change in a power provider and/or consumer).

In step 310, power is dynamically allocated from the power provider to the multiple power consumers. For instance, with reference to FIGS. 1 and 2, dynamic power allocator 204 may be configured to receive power allocation factors 208 and dynamically distribute power from a power provider to multiple power consumers either internal or external to computing device 102, based at least in part on the power delivery capabilities, the power consumption demands, and power allocation factors 208. Accordingly, dynamic power allocator 204 may automatically determine the most appropriate power provider(s) to utilize and the manner of allocating the available power to the various power consumers.

In implementations, dynamic power allocator 204 may select one or more power providers from which to allocate power in a number of ways. For instance, if multiple power providers are available, dynamic power allocator 204 may be configured to select the power provider with the highest power delivery capability (e.g., an AC power source such as charge provider 142). As an illustrative example, where a user is executing high activity applications that utilize increased processing power, and therefore exhibit higher power consumption demands, dynamic power allocator 204 may determine to utilize an external power provider (charge provider 142) which may provide steady power at a higher rate for longer periods of time, rather than an internal battery that depletes over time. In another scenario, dynamic power allocator 204 may aggregate the power delivery capabilities across a plurality of available power providers (e.g., charge provider 142 and/or one or more of batteries 108 and 126) from which to distribute power. In such a scenario, dynamic power allocator 204 may divide the aggregated power among the power consumers based, e.g., on the consumption demands and/or power allocation factors, such as a charging parameter, priority values, etc.

Thus, dynamic power allocator 204 need not select the same power provider in all instances, however. Rather, dynamic power allocator 204 may be configured to select the most appropriate provider based on a state of the overall system, as well as based on power allocation factors. For instance, dynamic power allocator 204 may determine to utilize an internal battery instead of a coupled external power source based on a user priority setting. In another instance, dynamic power allocator 204 may automatically switch from an internal battery to an external power source as the power provider if the internal battery depletes beyond a threshold charge capacity. In yet another instance, dynamic power allocator 204 may automatically switch from an internal battery to an external power source (or use an external power source in addition to an internal battery, or use another internal or external battery) in response to increased power consumption demands.

In other scenarios, dynamic power allocator 204 may reduce power drawn from a particular provider or select a different power provider in response to other power allocation factors, such as thermal limitations of the provider and/or to prevent data loss where a selected provider may not be capable of providing a minimum power to one or more consumers. In this manner, dynamic power allocator 204 may automatically maintain proper functioning of computing device 102 without additional user involvement.

As discussed above, certain devices may act as both a charge provider or a charge consumer (e.g., an internal or external battery). For such devices, dynamic power allocator 204 may automatically determine whether to utilize the device as a provider or a consumer based on the state of the overall system and power allocation factors (e.g., charging parameters such as a charging priority or a desired performance parameter). For example, where both internal batteries have been depleted below a threshold capacity, dynamic power allocator 204 may determine that an external power source should be utilized as a power provider, while one or both of the internal batteries may act as power consumers, thereby increasing the capacity of such batteries. In implementations, dynamic power allocator 204 may automatically perform a reallocation of power upon one or both of the batteries reaching a certain charge capacity, or upon the external power source being disconnected. Such a reallocation may be based, for example, on a number of factors, such as any of the power allocation factors 208 discussed herein.

It is noted, however, that dynamic power allocator 204 may determine not to utilize a device as either a power provider or a power consumer. For instance, based on an overall system state, dynamic power allocator 204 may utilize an external power provider (or one of the internal batteries) as the power provider and further determine not to charge a coupled internal or external battery. By dynamically determining not to provide power to one or more devices, dynamic power allocator 204 may distribute a greater portion of power from the external power source to other power consumers, such as a CPU or GPU of computing device 102 in response to increased processing demands.

In another instance where a power provider may be capable of a plurality of different power delivery levels (e.g., a power provider coupled via a USB Type C connection), dynamic power allocator 204 may negotiate an appropriate power level based on the applicable USB specification. In this manner, dynamic power allocator 204 may obtain an increased or decreased amount of power from the power provider depending on the overall state of computing device 102 and the power allocation factors.

Dynamic power allocator 204 is further configured to distribute the power from the one or more power providers to the various consumers, internal or external, of computing device 102. The distribution of power may be based in part, for instance, on the consumption demands for each power consumer. In implementations, dynamic power allocator 204 may to provide the ideal or maximum power demanded by each power consumer. In a situation where the power delivery capability of one or more providers is sufficient to deliver maximum power to each consumer, dynamic power allocator 204 may distribute power from the power provider according to the maximum power demanded. However, where the power delivery capability is not sufficient to meet an ideal or maximum power consumption demand for each power consumer, dynamic power allocator 204 may automatically determine which consumers will receive power from the provider(s) and the amount of power to be received. The determination may be based on, among other things, any one or more of the power allocation factors described herein, such as one or more charging parameters (e.g., a charging priority, a power parameter, a performance parameter, etc.). For instance, dynamic power allocator 204 may allocate power to one or more consumers based on a charging priority or a desired performance level provided by a user. Where a user assigns a high priority for a power consumer, dynamic power allocator 204 may attempt to deliver an ideal or maximum power amount to that consumer, while reducing the power delivered to one or more other consumers. In another instance where a user has set a high priority (e.g., a priority of "1") for one consumer and a lower priority for another consumer (e.g., a priority of "2"), dynamic power allocator 204 may attempt to charge the higher priority consumer first until a threshold charge capacity is obtained, after which the lower priority consumer is charged next. In another implementation, dynamic power allocator 204 may provide power to both consumers, but provide a higher power level to the higher priority consumer. In yet another scenario, dynamic power allocator 204 may take into account a charge capacity of both power consumers and balance power distribution based in part on the relative charge levels. The manner in which dynamic power allocator 204 may distribute power to one or more consumers is not limited to these illustrative examples, but rather may take into account any other factor described herein, as well as the overall power delivery capability and power consumption demands of computing device 102.

However, it is noted that the charging parameters discussed herein may not be outcome determinative in implementations. For instance, dynamic power allocator 204 may also take into account other power allocation factors (e.g., thermal considerations, data loss, increased user activity levels, schedule-based charging, tier-based pricing, a preferred power provider depleting below a threshold capacity level, etc.) in allocating power to one or more power consumers. In an example, dynamic power allocator 204 may automatically select an additional power provider (e.g., one or more internal batteries) from which to allocate power or reduce/terminate power provided to one or more consumers based an increased demand and/or the factors described herein. As another example, dynamic power allocator 204 may monitor utility pricing (e.g., tier-based or on-demand pricing) and automatically switch from an external power provider to an internal battery from which to allocate power (or vice versa) based on the utility pricing.

In yet another example, if the power provider comprises a battery, dynamic power allocator 204 may take into account the charge capacity of the battery in determining an allocation of power. In such instances, dynamic power allocator 204 may automatically reduce or terminate power provided to one or more consumers, obtain power from another power provider (e.g., another battery or charge provider 142 if connected) to increase a charge capacity of the presently used battery, or any combination thereof. In other implementations, dynamic power allocator 204 may monitor a charge and/or discharge curve of one or more batteries (either internal or external) and reduce or increase power provided to, or power consumed from, such batteries by regulating an amount of current draw. In monitoring charge and/or discharge curves, dynamic power allocator 204 may regulate power usage of such batteries in a manner that may extend the life of the battery (e.g., by avoiding an excessively high charge rate, draining the battery below a critical capacity, or charging a battery beyond a recommended level).

As discussed earlier, power allocation factors 208 may include a number of charging parameters, such as a charging priority, a charging duration, a charging rate, and/or a target charge percentage. In implementations where such values have been assigned (either based on preassigned values or via a user interaction), dynamic power allocator 204 may automatically reduce and/or terminate providing power to such a consumer upon satisfaction of one or more of the charging parameters. For instance, if a consumer device has reached a target charge percentage or a target duration, dynamic power allocator 204 may automatically terminate power to the device, thus making additional power available for other consumers coupled to computing device 102.

The examples described above are only illustrative of the manner in which dynamic power allocator 204 may dynamically distribute power from a provider to one or more consumers, and are not intended to be limiting. Dynamic power allocator 204 may utilize any combination of power providers to provide power to any combination of power consumers, whether internal or external, based on the power capabilities/demands of the overall system, as well as any of the power allocation factors described herein (e.g., charging parameters, schedule-based charging, tier-based pricing, a user activity level, a selected power mode, etc.). By taking into account the overall power capabilities/demands and the obtained power allocation factors, dynamic power allocator 204 may automatically distribute power efficiently and effortlessly.

As described above, in an implementation, dynamic power allocator 204 may operate in various ways to perform a reallocation of power to one or more power consumers.

For instance, FIG. 5 shows a flowchart for performing a reallocation of power. In one implementation, flowchart 500 may be implemented by system 100 and power balancer 120 as shown in FIGS. 1 and 2. Other structural and operational implementations will be apparent to persons skilled in the relevant art(s) based on the following discussion regarding flowchart 500.

Accordingly, for purposes of illustration, flowchart 500 of FIG. 5 is described with continued reference to both FIGS. 1 and 2. For instance, system 100 and power balancer 120 may operate according to flowchart 500. Note that the steps of flowchart 500 may be performed in an order different than shown in FIG. 5 in some implementations. Furthermore, not all steps of flowchart 500 need to be performed in all implementations. Further structural and operational implementations will be apparent to persons skilled in the relevant art(s) based on the following description regarding system 100, power balancer 120, and flowchart 500.

Flowchart 500 begins with step 502. In step 502, an indication of a change in the power delivery capability of a power provider or a power consumption demand of a power consumer is received. For example, with reference to FIGS. 1 and 2, dynamic power allocator 204 may receive an indication that a power provider (e.g., charge provider/consumer 134, charge provider 142, or an internal/external battery) has been coupled to or disconnected from computing device 102, or has changed a power delivery capability, since the most recent power allocation. Dynamic power allocator 204 may similarly receive an indication that a charge consumer (e.g., charge consumer 132, charge provider/consumer 134, wireless charge consumer 138, or an internal/external battery) has been coupled or disconnected from computing device 102, or has changed a power consumption demand, since the most recent power allocation was performed. Such indications may be received, for instance, in a similar manner as described earlier with respect to the transmission or automatic determination of a power delivery capability and/or a power consumption demand. Furthermore, indications may be received based one or more power allocation factors described herein (e.g., schedule-based charging, tier-based utility pricing, charging parameters, etc.).

In step 504, a user is prompted for power reallocation instructions. For instance, with reference to FIG. 4, user interface 400 may display a notification or an alert notifying the user that a power delivery capability and/or a power consumption demand has changed. User interface 400 may further be configured to prompt a user to provide power reallocation instructions based on the changed circumstances. For example, where a power provider has been connected or disconnected, or a battery has reached a threshold charge capacity enabling the battery to act as a provider, power balancer 120 may detect this change, and cause user interface 400 to prompt the user to input an instruction such that dynamic power allocator 204 may continue to use the same provider, a different provider, or any combination thereof. Similarly, where a power consumer has been connected or disconnected, or a battery has been depleted below a threshold charge capacity enabling the battery to act as a power consumer, user interface 400 may similarly prompt the user to input an instruction to reallocate power to one or more consumers. For example, a user may modify any of the charge parameters for a given device or category of device as shown in user interface 400, or may provide any other allocation instruction via user interface 400 (e.g., terminate a power consumer).

In some implementations, a user may further be notified, via user interface 400, of a recommended or suggested power reallocation that a user may select, modify, and/or reject. A recommendation or suggested power reallocation may include identifying a suggested power consumer, a category of power consumers, or any other grouping of power consumers to terminate or reduce in response to a change in the power delivery capability of a power provider or a power consumption demand. In another implementation, a recommendation or suggested power allocation may include identifying power consumers for which to provide or increase power, e.g., where a power delivery capability has increased or a power consumption demand of one or more other consumers has decreased. In yet another example, a recommendation may include identifying one an amount of additional power desired or needed to enhance the user experience (e.g., to increase the processing power to an ideal or maximum level). For instance, user interface may recommend that a user couple a charge provider with a higher capacity or recommend one or more additional power sources (e.g., batteries or power banks) to be coupled to computing device 102.

In step 506, a reallocation of power to the power consumers is performed. For example, with reference to FIG. 2, dynamic power allocator 204 may be configured to perform a reallocation of power based on the change in the power delivery capability and/or power consumption demands. In accordance with implementations, reallocation of power may be performed in a similar manner as described above with reference to step 310 of flowchart 300. For example, where dynamic power allocator 204 has not received a power reallocation instruction from a user, dynamic power allocator 204 may allocate power between the one or more available power providers and the various power consumers based on the overall system state and the allocation factors described above. In scenarios where a user has provided reallocation instructions in response to a change in a power delivery capability or a power consumption demand, dynamic power allocator 204 may additionally take the user instruction into account in reallocating power between the one or more power providers and the various power consumers. In some implementations, user interface 400 may be configured to display a notification to a user, in the form of a pop-up or the like, with an indication of the dynamic power reallocation.

It is noted, however, that in some implementations, dynamic power allocator 204 may reallocate power with or without user interaction. For example, in implementations, dynamic power allocator 204 may perform a reallocation of power based on a change in a power delivery capability or power consumption demand without notifying a user and/or prompting a user for a reallocation instruction. In the above manner, dynamic power allocator 204 may continuously assess the state of a system and its coupled components, and dynamically (with or without user interaction) reallocate power between providers and consumers to maintain an efficient distribution of power.

B. Example Portable Unit Battery Preservation Implementation

Figure 6:
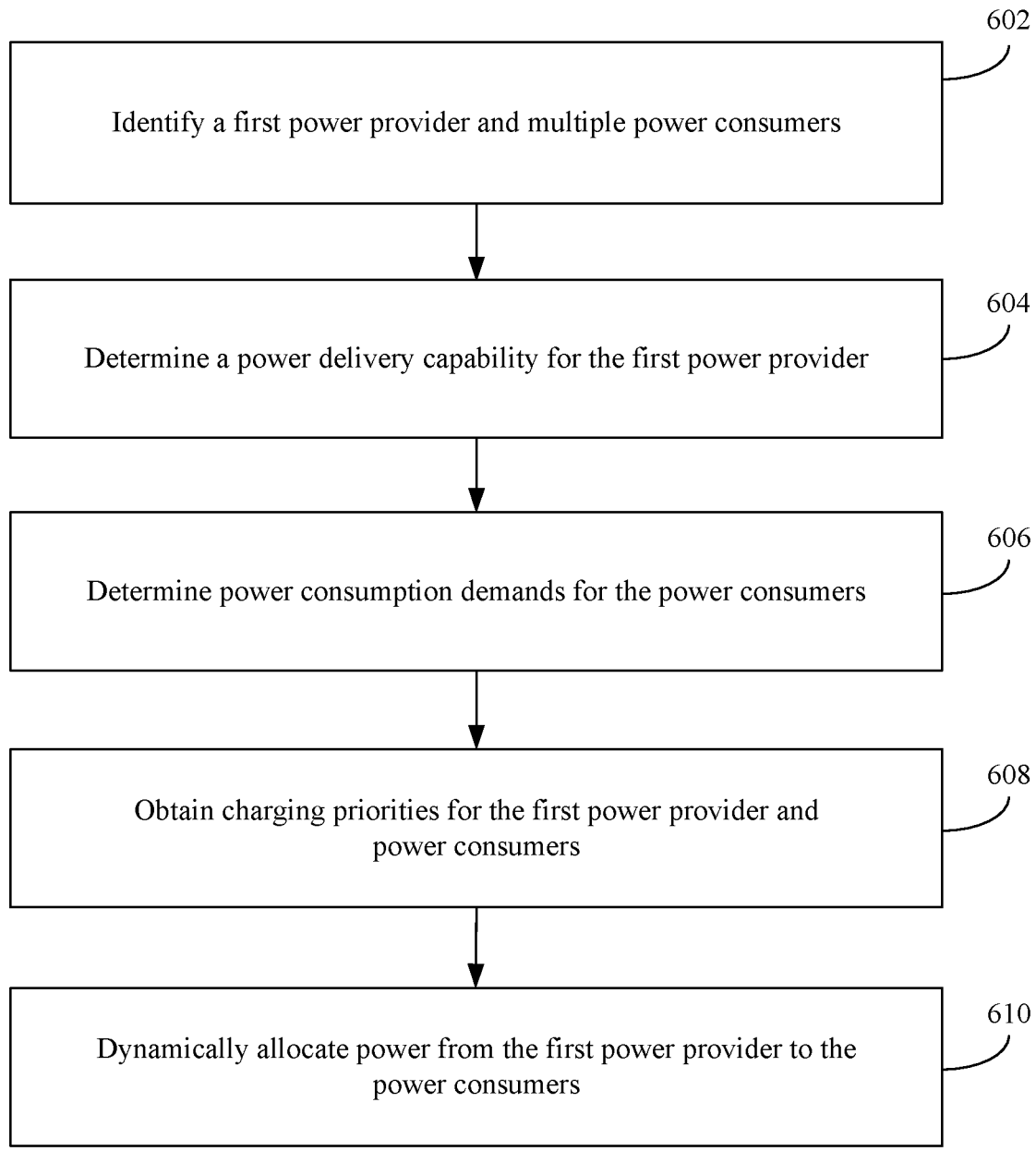
FIG. 6 shows a flowchart for dynamically allocating power from a power provider to power consumers, according to an example implementation.

In implementations, dynamic power allocator 204 may allocate power based, at least in part, on charging priorities for a power provider and/or a power consumer in various ways. For instance, FIG. 6 shows a flowchart for dynamically allocating power based on a charging priority. In an illustrative example, the charging priority may enable the preservation of power in an internal battery of a portable unit. In one implementation, flowchart 600 may be implemented by system 100 and power balancer 120 as shown in FIGS. 1 and 2.

Figure 7:
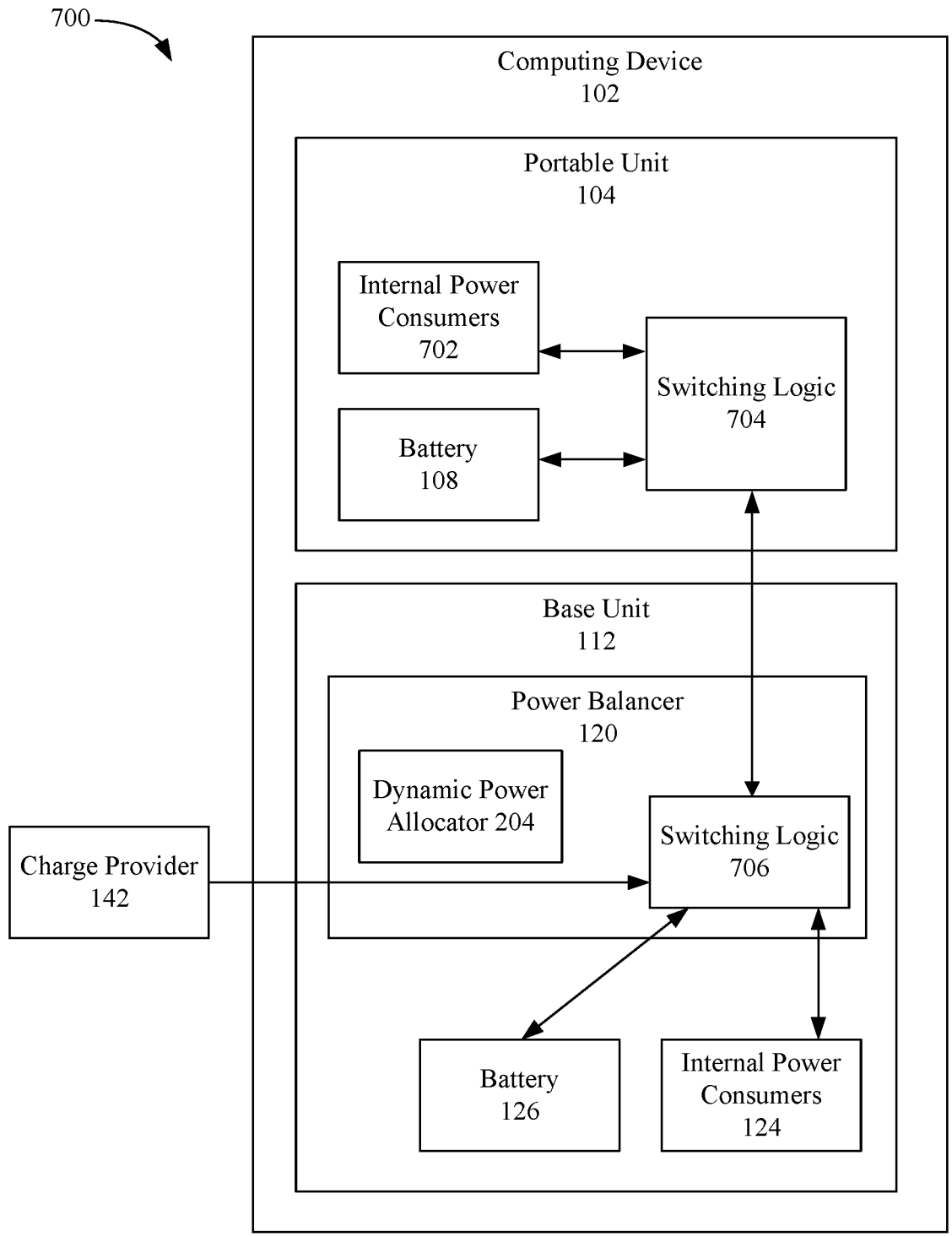
FIG. 7 shows a block diagram of a system for balancing power delivery in a computing device, according to an example implementation.

Dynamic power allocator 204 may also operate in various other ways to dynamically allocate power in a computing component. For instance, FIG. 7 shows a block diagram of a system 700, according to an example implementation. System 700 includes computing device 102 and charge provider 142. Computing device 102 includes portable unit 104 and base unit 112, as described above. As shown in FIG. 7, portable unit 104 may include battery 108, internal power consumers 702, and switching logic 704. Base unit 112 may include power balancer 120, internal power consumer(s) 124, and battery 126. Although not illustrated herein, power balancer 120 may similarly be implemented in portable unit 104, or in a combination of base unit 112 and portable unit 104, as described above. In implementations, internal power consumers 702 are similar to internal power consumer(s) 124 described earlier with respect to FIG. 1. Power balancer 120 of FIG. 7 includes dynamic power allocator 204 and may further comprise switching logic 722. Switching logic 704 and switching logic 706, collectively, may be configured to control the switching and/or flow of power between charge provider 142, battery 108, battery 126, internal power consumer(s) 124, and internal power consumers 702 based on one or more charging priorities. In an implementation, flowchart 600 of FIG. 6 may be implemented by power balancer 120, switching logic 704, and/or switching logic 706 of system 700.

Accordingly, for purposes of illustration, flowchart 600 of FIG. 6 is described with continued reference to both FIGS. 1, 2, and 7. For instance, system 100, power balancer 120, system 700, switching logic 704, and/or switching logic 706 may operate according to flowchart 600. Note that the steps of flowchart 600 may be performed in an order different than shown in FIG. 6 in some implementations. Furthermore, not all steps of flowchart 600 need to be performed in all implementations. Further structural and operational implementations will be apparent to persons skilled in the relevant art(s) based on the following description regarding system 100, power balancer 120, system 700, switching logic 704, switching logic 706, and flowchart 600.

Flowchart 600 begins with step 602. In step 602, a first power provider and multiple power consumers are identified. In step 604, a power delivery capability for the first power provider is determined. In step 606, power consumption demands for the power consumers are determined. Steps 602, 604, and 606 may be performed in a manner substantially similar as described above with reference to steps 302, 304, and 306, respectively, of FIG. 3.

In step 608, charging priorities for the first power provider and the power consumers are obtained. For example, with reference to FIGS. 2 and 7, dynamic power allocator 204 may obtain charging priorities for any one of charge provider 142, battery 108, battery 126, internal power consumer(s) 124, internal power consumers 702, or any external power consumers (not shown). In implementations, charging priorities obtained by dynamic power allocator 204 may be similar to charging priorities described above with reference to FIG. 4. For example, a user may identify a charging priority for any device or category of devices that enable dynamic power allocator 204 to prioritize such devices either for providing power or for consuming power. In another implementation, dynamic power allocator 204 may obtain charging priorities for one or more devices based on a power mode selected by a user. In yet another implementation, charging priorities may be stored in a suitable storage (e.g., storage 206) and obtained by dynamic power allocator 204. In yet a further implementation, dynamic power allocator 204 may automatically obtain a preassigned charging priority for one or more devices from storage 206 absent any user configuration. It is noted that although storage 206 and/or power allocation factors 208 are described herein as local to computing device 102 (e.g., in portable unit 104 and/or base unit 112), storage 206 and/or power allocation factors 208 may be obtained by a service executing on computing device 102 from one or more remotely located storages (e.g., cloud-based storages), through a suitable network interface or the like.

In implementations, a charging priority may include prioritizing charging or discharging one internal battery over another internal battery. For instance, in implementations where base unit 112 contains battery 126 (e.g., a first battery) and portable unit 104 contains battery 108 (e.g., a second battery), a charging priority may prioritize charging and/or discharging battery 126 over battery 108 when base unit 112 is attached to portable unit. Any number of batteries (power providers) may have corresponding priorities that establish their relative charging and discharging priorities. For instance, because portable unit 104 may be detachable and operable as a standalone computing device (e.g., as a tablet or the like), it may be desirable to preserve battery 108 for prolonged use of portable unit 104 when detached.

Thus, in implementations, a charging priority may prioritize discharging battery 126 prior to discharging battery 108. In the event that a charge capacity of battery 126 declines below a threshold charge capacity (e.g., below a 10% charge capacity), battery 108 may be utilized to ensure uninterrupted or continuous functioning of computing device 102. In another implementation, where an external charge provider is present (e.g., charge provider 142), a charging priority may prioritize charging battery 108 over battery 126, thus increasing the potential operating time of portable unit 104 if detached from base unit 112. In this manner, when portable unit 104 is detached from base unit 112, portable unit 104 may operate for a prolonged period of time as a result of an increased charge capacity of battery 108.

Such a charging priority (or any other power allocation factor discussed earlier) may be preset in power balancer 120 and/or may be modified, enabled, and/or disabled by a user via user interface 400. In another implementation, a charging priority or allocation factor as described herein may be enabled or disabled automatically based on a user's historic usage patterns, such as the manner in which a user utilizes computing device 102 with portable unit 104 coupled to base unit 112, the times of day and/or period of time when a user a user detaches portable unit 104 from base unit 112, the amount of processing and/or application usage during such times, etc. In yet another implementation, a charging priority or allocation factor as described herein may be enabled or disabled automatically based on predictive information for a user's future behavior. For instance, the charging priority or allocation factor may be enabled or disabled based on an intelligent personal assistant installed on computing device 102 or installed on an external device coupled to computing device 102, a user's calendar appointments (e.g., enabling a charging priority if a user is expected to be traveling), etc.

In step 610, power is dynamically allocated from the first power provider to the power consumers. Steps 610 may be performed in a manner substantially similar as described above with reference to steps 310 of FIG. 3. For instance, where a charging priority prioritizes charging and/or discharging a first battery over a second battery, dynamic power allocator 204 may automatically allocate power in computing device 102 such that the battery 126 is discharged prior to discharging the battery 108 (e.g., by only using battery 126). In yet another implementation, dynamic power allocator 204 may utilize both battery 126 and battery 108 in providing power to power consumers by discharging battery 126 at a higher rate than battery 108. Similarly, dynamic power allocator may utilize the charging priority to prioritize charging battery 108 over the battery 126 when an external power provider is present. In this manner, power in battery 108 may be reserved such that portable unit 104 may provide a prolonged user when detached from base unit 112.

In an implementation, dynamic power allocator 204 may utilize switching logic 704 and switching logic 706 to control the flow of power between charge provider 142, battery 108, battery 126, internal power consumers 702, and internal power consumer(s) 124. For example, when dynamic power allocator 204 determines that a certain provider or consumer is to transmit or receive power based on a charging priority, switching logic 704 and switching logic 706 may utilize suitable circuity to control the flow of power. As an example, switching circuity may include any combination of switches, transistors, voltage or current controllers, current throttle circuitry, diodes, capacitors, etc. to switch and control the amount of flow between one or more power providers and one or more power consumers of computing device 102. For instance, where charge provider 142 is present, switching logic 704 and 706 may activate one or more switches or throttles to enable power to flow from charge provider 142 to battery 108 to enable automatically charging of battery 108, while disabling charging of battery 126. In another example, where charge provider 142 is not present, one or more switches or current throttles may be implemented enabling battery 126 to transmit power to internal power consumer(s) 124 and internal power consumers 702, while preventing power of battery 108 being utilized to either provide or consume power. These examples are not meant to be limiting, and any other manner of switching and/or controlling the flow of power across power providers and power consumers may be implemented in accordance with the implementations herein.

C. Example Multiple Battery Implementations with Correlated Charge/Discharge Rates In another implementation, dynamic power allocator 204, based on a charging priority prioritizing charging and/or discharging battery 108 and battery 126 at rates correlated to each other, may allocate power using switching logic 704 and 706 such that the batteries may reach a fully charged or fully discharged state at the same or approximately the same time. For instance, if battery 126 is sized such that it has twice the potential storage capacity as battery 108, battery 126 may be discharged at a discharge rate approximately twice as high as the discharge rate for battery 108. In this manner, both batteries may be discharged at correlated rates such that batteries 108 and 126 reach a fully discharged state at the same or nearly the same time. In another scenario, where one battery is at a 10% charge capacity, and the other battery has a 90% charge capacity, dynamic power allocator 204 may allocate power from an external provider in a manner that charges batteries at a charge rate suitable to attain full charges (e.g., 100% charges) in both batteries at the same or approximately the same time, e.g., by enabling a greater current flow to the battery with the lesser charge.

In implementations, dynamic power allocator 204 may also reduce power provided to one or more internal consumer(s) 124 or internal consumers 702 to enable batteries 108 and 126 reaching a charged or discharged state at the same or approximately same time. For instance, dynamic power allocator 204 may reduce power provided to an external power consumer (e.g., an external battery), disable one or more USB ports, reduce a processor performance to thereby reduce power consumption by the processor, or take any other action to achieve a simultaneous or nearly simultaneous charging and/or discharging of batteries 108 and 126 as described.

As discussed in both Sections II.B and II.C above, a charging priority prioritizing a correlated rate of charging and/or discharging between batteries 108 and 126 may be modified, enabled, and/or disabled via a user interface, or may be preset in power balancer 120. Such a charging priority (in addition to any of the charging parameters and/or power allocation factors described herein) may also be enabled and/or disabled based on a user's historic usage patterns and/or based on predictive information for a user's future behavior, as discussed above.

D. Example Reduced Power Supply Capability Implementations

In accordance with the techniques described above, dynamic power allocator 204 may also be configured to automatically regulate power to one or more power consumers (internal or external) in response to determining that a power delivery capability of an external power provider (e.g., charge provider 142) is delivering power below a threshold value. For example, charge provider 142 may be connected to a power source (an AC power source) with limited capability or a decreased power output. This may occur in a number of environments, such as in an airplane, a train, a vehicle, or where the power supply may be coupled to a generator (e.g., a backup generator). In such instances, the power source may be providing at a less than optimal power output, which can alter the power output of charge provider 142. In other scenarios, charge provider 142 may have an internal malfunction that may result in a reduced or inconsistent power output of charge provider 142. In yet another example, a charge provider with an incorrect or incompatible power rating may be coupled to computing device 102, or otherwise output a power level that is not at a level expected by computing device 102. Dynamic power allocator 204 may determine that charge provider 142 is not providing an appropriate or ideal power output at or above a minimum threshold value in any number of ways, such as by measuring a received voltage, current, and/or resistance of charge provider 142, or in any other suitable manner In implementations, therefore, dynamic power allocator 204 may dynamically reduce power allocated to one or more internal or external power consumers of computing device 102 below an associated power consumption demand based on the reduced or decreased power of charge provider 142. In an implementation, dynamic power allocator 204 may also take into account additional power losses due to any conversion inefficiencies of charge provider 142 in reducing power allocated to one or more power consumers. For instance, dynamic power allocator 204 may reduce a power provided to a power consumer below a power consumption demand by disabling one or more power consumers (e.g., disable power consumer coupled to a USB port, preventing a device from being charged, etc.) or reducing a power level transmitted to a power consumer (e.g., reduce a power level on a USB Type C port, limiting the power provided to a battery being charged, etc.). In another implementation, dynamic power allocator 204 may reduce the performance of one or more processors (or other internal components) of computing device 102, resulting in a decreased power consumption by such processors.

In reducing a power provided to one or more consumers in this manner, a risk of drawing an excessive load and/or activation of an overload protective circuit on charge provider 142 may be prevented. Furthermore, by reducing the power to one or more power consumers of computing device 102, dynamic power allocator 204 may reduce the risk that such consumers become unexpectedly underpowered and cause a fault condition or otherwise become inoperable.

Such a power reducing capability of dynamic power allocator 204 may be implemented in manner as described above. For example, reducing power provided to one or more consumers based on a user configurable setting (e.g., as a charging priority that prioritizes the operability of the components of computing device 102 over other factors) that may be modified, enabled, and/or disabled. The power reducing capability may also be preset in power balancer 120 that may or may not be modified by a user input in implementations.

In another example, user interface 400 may enable a user to input a power limit that may be referenced by dynamic power allocator 204 in the event of the power delivery capability of an external power provider is not operating as expected or desired. The power limit may be, for instance, a minimum threshold value below dynamic power allocator 204 may determine to reduce the power allocated to one or more internal or external power consumers of computing device 102 below an associated power consumption demand (e.g., by selectively terminating or reducing power to one or more consumers). In other implementations, the power limit may be a maximum amount of power from which a power provider may output. For example, user interface 400 may enable a user to input a maximum power providing capability for a device or category of devices. If the collective power consumption demand is above this power level, dynamic power allocator 204 may reduce and/or terminate one or more consumers using techniques described herein.

III. Example Computer System Implementation

Computing device 102, portable unit 104, base unit 112, power balancer 120, charge consumer 132, charge provider/consumer 134, wireless charge consumer 138, charge provider 142, flowchart 300, flowchart 500, and/or flowchart 600 may be implemented in hardware, or hardware combined with software and/or firmware. For example, power balancer 120, flowchart 300, flowchart 500, and/or flowchart 600 may be implemented as computer program code/instructions configured to be executed in one or more processors and stored in a computer readable storage medium. Alternatively, power balancer 120, flowchart 300, flowchart 500, and/or flowchart 600 may be implemented as hardware logic/electrical circuitry.

For instance, in an implementation, one or more, in any combination, of power balancer 120, flowchart 300, flowchart 500, and/or flowchart 600 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
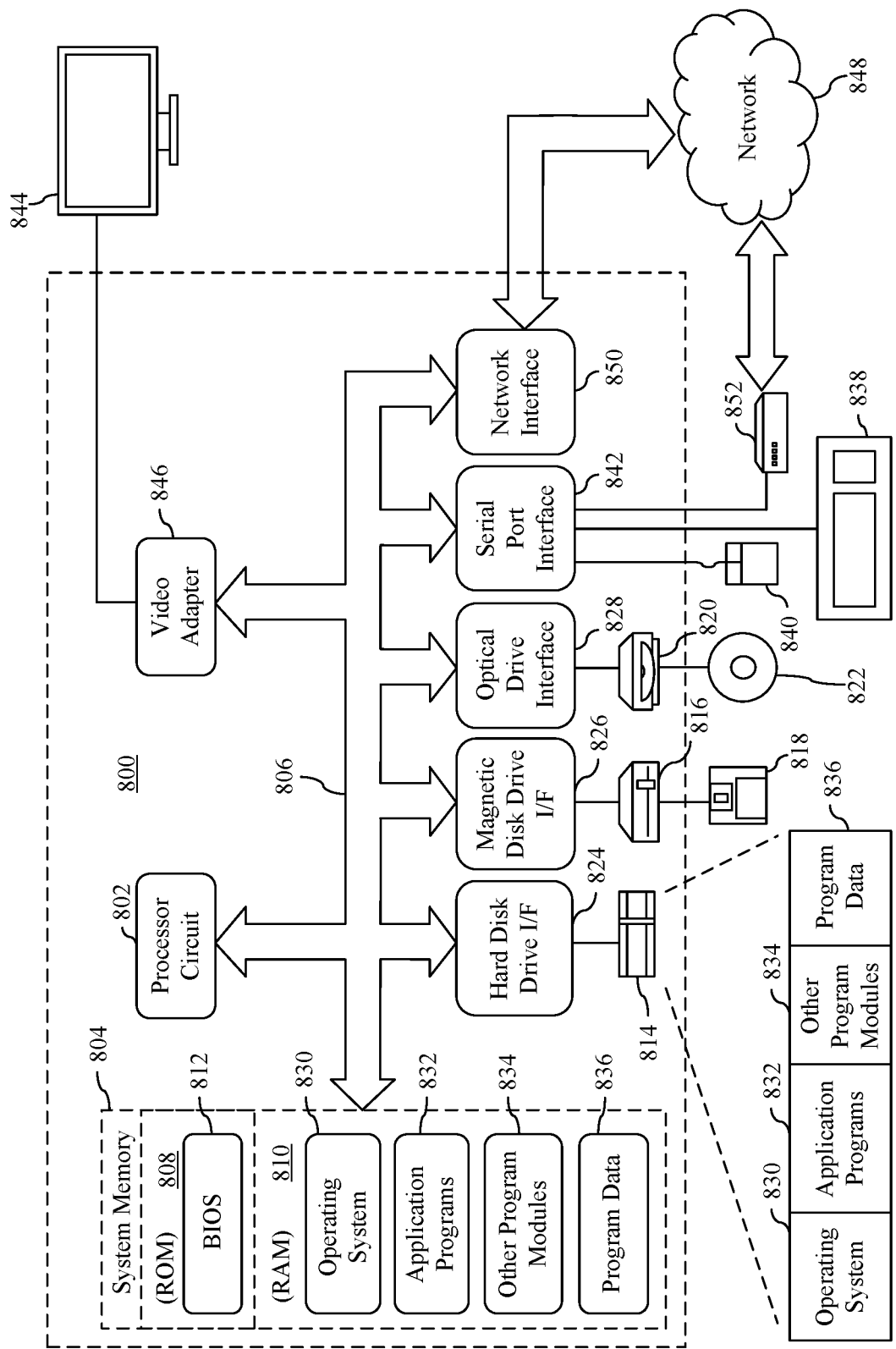
FIG. 8 is a block diagram of an example processor-based computer system that may be used to implement various example implementations.

FIG. 8 depicts an example implementation of a computing device 800 in which implementations may be implemented. For example, computing device 102, portable unit 104, base unit 112, charge consumer 132, charge provider/consumer 134, wireless charge consumer 138, and charge provider 142 may each be implemented in one or more computing devices similar to computing device 800 in stationary or mobile computer implementations, including one or more features of computing device 800 and/or alternative features. The description of computing device 800 provided herein is provided for purposes of illustration, and is not intended to be limiting. Implementations may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for power balancer 120, flowchart 300, flowchart 500, and/or flowchart 600 (including any suitable step of flowcharts 300, 500, and/or 600), and/or further implementations described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus.

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers. Display screen 814, and/or any other peripheral output devices (not shown) may be used for user interface 106, and/or any further implementations described herein.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Implementations are also directed to such communication media that are separate and non-overlapping with implementations directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to contain features of implementations discussed herein. Accordingly, such computer programs represent controllers of the computing device 800.

Implementations are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Implementations

A power balancing system in a computing component is disclosed herein. The system includes: a power budgeter configured to identify a power provider and a plurality of power consumers, determine a power delivery capability for the power provider, and determine power consumption demands for the power consumers; an interactive interface to configure one or more power allocation factors, the one or more power allocation factors including a charging parameter for a power consumer; and a dynamic power allocator configured to receive the one or more power allocation factors and dynamically allocate power from the power provider to the power consumers based at least in part on the power delivery capability, the power consumption demands, and the one or more power allocation factors.

In one implementation of the foregoing system, the interactive interface is configured to display an indication of the dynamically allocated power.

In another implementation of the foregoing system, the dynamic power allocator is configured to receive an indication of a change in the power delivery capability, and in response to the indication, dynamically reallocate the power to the power consumers.

In another implementation of the foregoing system, the dynamic power allocator is configured to prompt, via the interactive interface, for power reallocation instructions in response to the indication, and perform the dynamic reallocation of the power in response to receiving the power reallocation instructions.

In another implementation of the foregoing system, the dynamic power allocator is configured to receive an indication of a change in the power consumption demands, and in response to the indication, dynamically reallocate the power.

In another implementation of the foregoing system, the dynamic power allocator is configured to prompt, via the interactive interface, for power reallocation instructions in response to the indication, and perform the dynamic reallocation of the power in response to receiving the power reallocation instructions.

In another implementation of the foregoing system, the charging parameter includes at least one of a charging priority, a charging duration, a charging rate, or a target charging percentage.

In another implementation of the foregoing system, the interactive interface is configured to display an interface control to modify a preassigned value for a charging parameter.

A method of balancing power delivery in a computing component is described herein. The method includes: identifying a power provider and multiple power consumers; determining a power delivery capability for the power provider; determining power consumption demands for the power consumers; providing an interactive interface to configure one or more power allocation factors, the one or more power allocation factors including a charging parameter for a power consumer; and dynamically allocating power from the power provider to the power consumers based at least in part on the power delivery capability, the power consumption demands, and the configured one or more power allocation factors.

In one implementation of the foregoing method, the method further comprises: displaying an indication of the dynamically allocated power in the interactive interface.

In another implementation of the foregoing method, the method further comprises receiving an indication of a change in the power delivery capability, and in response to the indication, performing a reallocation of the power to the power consumers.

In another implementation of the foregoing method, the performing the reallocation of the power to the power consumers comprises prompting, via the interactive interface, for power reallocation instructions in response to the indication, and performing the reallocation according to the power reallocation instructions received via the interactive interface.

In another implementation of the foregoing method, the method further comprises receiving an indication of a change in the power consumption demands, and in response to the indication, performing a reallocation of the power to the power consumers.

In another implementation of the foregoing method, the performing the reallocation of the power to the power consumers comprises prompting, via the interactive interface, for power reallocation instructions in response to the indication, and performing the reallocation according to the power reallocation instructions received via the interactive interface.

In another implementation of the foregoing method, the charging parameter includes at least one of a charging priority, a charging duration, a charging rate, or a target charging percentage.

In another implementation of the foregoing method, the method further comprises displaying an interface control in the interactive interface to modify a preassigned value for a charging parameter.

A method of balancing power delivery in a computing component is described herein. The method includes identifying a first power provider and multiple power consumers; determining a power delivery capability for the first power provider; determining power consumption demands for the power consumers; obtaining charging priorities corresponding to the first power provider and multiple power consumers; and dynamically allocating power from the first power provider to the power consumers based at least in part on the charging priorities.

In one implementation of the foregoing method, the computing component includes a first battery that is the first power provider, and a portable unit detachably coupled to the computing component includes a second battery that is a second power provider and wherein said dynamically allocating power comprises dynamically allocating power from the first and second power providers to the power consumers based at least in part on the charging priorities.

In another implementation of the foregoing method, the dynamically allocating power comprises preserving power of the second battery while providing power to the power consumers with power of the first battery, determining power stored in the first battery declined to a threshold level, and providing the power consumers with power of the second battery.

In another implementation of the foregoing method, the dynamically allocating power comprises correlating discharge rates of the first and second batteries.

In another implementation of the foregoing method, the computing component includes a first battery that is a first power consumer, and a portable unit detachably coupled to the computing component includes a second battery that is a second power consumer; and wherein said dynamically allocating power comprises charging the first and second batteries at correlated charge rates.

In another implementation of the foregoing method, the dynamically allocating power comprises determining that the power delivery capability is below a threshold value and decreasing power allocated to a power consumer below a power consumption demand associated with the power consumer.

V. Conclusion

While various example implementations have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described example implementations, but should be defined only in accordance with the following claims and their equivalents.

What is claimed is:

1. A power balancing system in a computing component, comprising:
    an interactive interface to configure one or more power allocation factors, the one or more power allocation factors including a charging parameter for a power consumer; and
    a dynamic power allocator configured to:
    receive the one or more power allocation factors;
    dynamically allocate power from an external power provider to multiple power consumers based at least on the one or more power allocation factors, the multiple power consumers including a power consumer internal to the computing component with a dynamically changing power consumption demand, a first battery in a base unit of the computing component, and a second battery in a display unit of the computing component detachably coupled thereto;
    determine that the power consumption demand of the first battery or the second battery has changed; and
    reallocate power from the external power provider to at least the power consumer internal to the computing component and the first battery or second battery in response to the changed power consumption demand.

2. The system of claim 1, wherein the interactive interface is configured to display an indication of the dynamically allocated power.

3. The system of claim 1, wherein the dynamic power allocator is configured to:
    receive an indication of a change in a power delivery capability; and
    in response to the indication, dynamically reallocate the power to the multiple power consumers.

4. The system of claim 3, wherein the dynamic power allocator is configured to:
    prompt, via the interactive interface, for power reallocation instructions in response to the indication; and
    perform the dynamic reallocation of the power in response to receiving the power reallocation instructions.

5. The system of claim 1, wherein the dynamic power allocator is configured to:
    receive an indication of a change in a power consumption demand; and
    in response to the indication, dynamically reallocate the power.

6. The system of claim 5, wherein the dynamic power allocator is configured to:
    prompt, via the interactive interface, for power reallocation instructions in response to the indication; and
    perform the dynamic reallocation of the power in response to receiving the power reallocation instructions.

7. The system of claim 1, wherein the charging parameter includes at least one of a charging priority, a charging duration, a charging rate, or a target charging percentage.

8. The system of claim 1, wherein the interactive interface is configured to display an interface control to modify a preassigned value for a charging parameter.

9. The system of claim 1, wherein the display unit includes a display and wherein the dynamic power allocator is further configured to: determine that the power consumption demand of the first battery and the second battery has changed.

10. The system of claim 1, wherein the dynamic power allocator is further configured to: reallocate power from the external power provider to at least the power consumer internal to the computing component and the first battery and second battery in response to the changed power consumption demand.

11. A method of balancing power delivery in a computing component, the method comprising:
identifying an external power provider and multiple power consumers, the multiple power consumers including a power consumer internal to the computing component, a first battery in a base unit of the computing component, and a second battery in a screen portion of the computing component detachably coupled thereto;
determining a power delivery capability for the power provider;
determining power consumption demands for the multiple power consumers, the power consumption demands including at least a dynamically changing power consumption demand for the power consumer internal to the computing component;
providing an interactive interface to configure one or more power allocation factors, the one or more power allocation factors including a charging parameter for a power consumer;
dynamically allocating power from the external power provider to at least the power consumer internal to the computing component, the first battery, and the second battery based at least in part on the power delivery capability, the power consumption demands, and the configured one or more power allocation factors;
determining that the power consumption demand of the first battery or the second battery has changed; and
reallocating power from the external power provider to at least the power consumer internal to the computing component and the first battery or the second battery in response to the changed power consumption demand.

12. The method of claim 11, further comprising:
displaying an indication of the dynamically allocated power in the interactive interface.

13. The method of claim 11, further comprising:
receiving an indication of a change in the power delivery capability; and
in response to the indication, performing a reallocation of the power to the multiple power consumers.

14. The method of claim 13, wherein said performing the reallocation of the power to the multiple power consumers comprises:
prompting, via the interactive interface, for power reallocation instructions in response to the indication; and
performing the reallocation according to the power reallocation instructions received via the interactive interface.

15. The method of claim 11, further comprising:
receiving an indication of a change in the power consumption demands; and
in response to the indication, performing a reallocation of the power to the multiple power consumers.

16. The method of claim 15, wherein said performing the reallocation of the power to the multiple power consumers comprises:
prompting, via the interactive interface, for power reallocation instructions in response to the indication; and
performing the reallocation according to the power reallocation instructions received via the interactive interface.

17. The method of claim 11, wherein the charging parameter includes at least one of a charging priority, a charging duration, a charging rate, or a target charging percentage.

18. The method of claim 11, further comprising:
displaying an interface control in the interactive interface to modify a preassigned value for a charging parameter.

19. A method of balancing power delivery in a computing component, the method comprising:
identifying a first power provider and multiple power consumers in the computing component, the first power provider comprising a first battery;
identifying a second power provider in a portable unit detachably coupled to the computing component that includes a second battery;
determining a power delivery capability for the first power provider;
determining power consumption demands for the multiple power consumers;
obtaining charging priorities corresponding to the first power provider and multiple power consumers; and
dynamically allocating power from the first power provider in the computing component at a first discharge rate and the second power provider in the portable unit at a second discharge rate different from the first discharge rate to the multiple power consumers based at least in part on the charging priorities.

20. The method of claim 19, wherein said dynamically allocating power comprises:
preserving power of the second battery while providing power to the multiple power consumers with power of the first battery;
determining power stored in the first battery declined to a threshold level; and
powering the multiple power consumers with power of the second battery.

21. The method of claim 19, wherein said dynamically allocating power comprises:
correlating discharge rates of the first and second batteries.

22. The method of claim 19, further comprising:
charging the first and second batteries at correlated charge rates.

23. The method of claim 19, wherein said dynamically allocating power comprises:
determining that the power delivery capability is below a threshold value; and
decreasing power allocated to a power consumer below a power consumption demand associated with the power consumer.

24. The method of claim 19, further comprising:
receiving an indication of a change in the power delivery capability; and
in response to the indication, performing a reallocation of the power to the multiple power consumers.

* * * * *